United States Patent [19]

Greggain et al.

[11] Patent Number: 5,594,676
[45] Date of Patent: Jan. 14, 1997

[54] DIGITAL IMAGE WARPING SYSTEM

[75] Inventors: Lance Greggain, Woodbridge; James Goel, Ajax; Robert Beyer, Waterloo, all of Canada

[73] Assignee: Genesis Microchip Inc., Canada

[21] Appl. No.: 361,539

[22] Filed: Dec. 22, 1994

[51] Int. Cl.[6] .............................. G06F 17/10; G06F 17/17
[52] U.S. Cl. ............................... 364/724.01; 364/724.1
[58] Field of Search ............................. 364/723, 724.01, 364/724.1; 382/268, 293, 295, 298

[56] References Cited

U.S. PATENT DOCUMENTS

| | | | |
|---|---|---|---|
| 5,175,808 | 12/1992 | Sayre | 395/133 |
| 5,204,944 | 4/1993 | Norberg et al. | 395/127 |
| 5,355,328 | 10/1994 | Arbeiter et al. | 364/724.1 |
| 5,384,912 | 1/1995 | Ogrinc et al. | 395/164 |

OTHER PUBLICATIONS

George Wolberg, "Digital Image Warping", 1964, Title Page and Table of Contents.
George Wolberg, PH.D., "Separable image warping: Implications and techniques", 1990, Abstract.

*Primary Examiner*—Chuong D. Ngo
*Attorney, Agent, or Firm*—Staas & Halsey

[57] ABSTRACT

A system is provided for performing real-time warping in one or two dimensions (eg. dynamic zoom and shrink in both horizontal and vertical directions), and temporal warping of image frames (eg. fast motion and slow motion). The system accomplishes warping with proper Nyquist bandlimiting. Three different processes are performed in sequence to create the warped image according to the present invention. The first process maps a desired target pixel or frame spacing to an appropriate FIR filter wherein the size of the FIR filter is chosen based on the desired target pixel or frame spacing. Once the filter is chosen, a second process creates an appropriate number of upsampled pixels, lines or frames based on the input source pixels, lines or frames. The last process multiplies the correct filter coefficients from the first process with the interpolated pixels, lines or frames from the second process, resulting in correctly Nyquist bandlimited target pixels, lines or frames.

23 Claims, 5 Drawing Sheets

DIGITAL IMAGE WARPING SYSTEM

FIELD OF THE INVENTION

The present invention relates in general to digital signal processing, and more particularly to an image warping system for generating an output stream of warped pixels and/or lines and/or frames from an input stream of pixels and/or lines and/or frames, respectively.

BACKGROUND OF THE INVENTION

Digital image warping is a process of dynamically resampling a regularly spaced source image to produce a target image with different spacing than the source image. Many modern movies use digital warping to create mind boggling effects such as perspectives, odd shaped image boundaries, and texture mapping, to name but a few. Prior art real time image warping systems are extremely complicated and expensive due to the massive number of computations which must be performed in real time. Prior art systems do not dynamically bandlimit the spatial frequency of the warped image to the Nyquist limit, causing unwanted aliasing distortion. Examples of well known prior art digital image warping systems are described in the following publications and patent:
I. Wolberg, George, "Separable Image Warping: Implications and Techniques", Ph.D. Thesis, Dept. of Computer Science, Columbia University, N.Y., 1990, and "Digital Image Warping", IEEE Computer Society Press, Los Alamitos, Calif., 1990;
II. U.S. Pat. No. 5,355,328 (Arbeiter, et al).

SUMMARY OF THE INVENTION

According to the present invention, an image warping system is provided for performing real-time dynamic zoom and shrink in both horizontal and vertical directions with proper Nyquist bandlimiting, and requiring no external line stores or other memory. This same invention can also temporally warp images (eg. dynamic changes between fast motion and slow motion) by utilizing external frame stores in place of registers. Accordingly, the system of the present invention constitutes a significant advance over the known prior art. Three different processes are performed in sequence to create the warped image according to the present invention. The first process maps a desired target pixel (or line or frame) spacing to an appropriate FIR filter wherein the size of the FIR filter is chosen based on the desired target pixel (or line or frame) spacing. Once the filter is chosen, a second process creates an appropriate number of upsampled pixels (or lines or frames) based on the input source pixels (or lines or frames). The last process multiplies the correct filter coefficients from the first process with the interpolated pixels (or lines or frames) from the second process, resulting in correctly Nyquist bandlimited target pixels (or lines or frames).

Thus, in accordance with one aspect of the invention, there is provided an apparatus and method for digitally warping an input stream of one of either pixels and/or lines and/or frames to produce an output stream of warped pixels and/or lines and/or frames in accordance with a user defined target increment defining the desired spacing between output pixels and/or lines and/or frames. In the case of digitally warped pixels and/or lines, the resulting image is considered to be spatially warped. In the case of digitally warped frames, the resulting set of frames is considered to be temporally warped.

In a first embodiment of the invention, the system comprises a filter look-up table for mapping the target increment into a specific filter size, and a pair of registers to pipeline three successive filter sizes output from the filter look-up table for input to a pair of comparators. A first one of the comparators determines the largest filter size from the three values output by the filter look-up table and both registers, while the second comparator determines the largest filter size output from the filter look-up table and the first register. The output of the first comparator is received by an upsample increment generator which maps the filter size to a filter factor and then right-shifts the target increment by this amount to generate an upsample increment. The upsample increment is received by an interpolator which in response generates an appropriate number of evenly spaced upsampled pixel values. The output from the second comparator is stored in a pipeline comprising two further registers connected respectively to left and right half kernel filter generators. The left and right half kernel filter generators receive and multiply the upsampled pixels from the interpolator by respective half kernel coefficients to create the warped output pixels.

In a second embodiment of the invention, the system comprises a filter look-up table for mapping the target increment into a specific filter size, and a single register for holding the filter size from the filter look-up table for input into left and right half kernel filter generators. The output of the filter look-up table is received by an upsample increment generator which maps the filter size to a filter factor and then right-shifts the target increment by this amount to generate an upsample increment. The upsample increment is received by an interpolator which in response generates an appropriate number of evenly spaced upsampled pixel values. The left and right half filter kernel generators receive and multiply the upsampled pixels from the interpolator by respective half kernel coefficients to create the warped output pixels.

Each embodiment can be extended to digitally warp lines and/or frames by replacing the registers with line stores and frame stores, respectively. These larger memory storage units perform the identical function as the registers in the embodiments described in detail below.

The warping technique of the present invention may be implemented utilizing the image filtering and image extension apparatus and methods described in co-pending U.S. patent application Ser. Nos. 08/126,388; 08/125,530; 08/172,065; 08/124,201, all assigned to Genesis Microchip Inc., the contents of which are incorporated herein by reference.

Furthermore, the digital image warping system according to the present invention builds on technology described in U.S. Pat. No. 5,355,328 (Arbeiter et al), referred to above, which relates to a method of resizing source images to an arbitrary but fixed target image size. According to this prior art system, each target pixel and/or line and/or frame is resized by the same amount relative to the source pixel and/or line and/or frame. According to the present invention, each target pixel and/or line and/or frame may be individually sized arbitrarily relative to the source pixel and/or line and/or frame. More specifically, according to the present invention, source pixels and/or lines and/or frames are dynamically upsampled based on changing target pixel and/or line and/or frame resize factors. The source pixels and/or lines and/or frames are always upsampled to the nearest first octave and then decimated by fixed sized FIR filters to create Nyquist bandlimited target pixels and/or lines and/or frames. The filter sizes are dynamically determined for each target pixel and/or line and/or frame based on spatial positioning or temporal positioning as dictated by the user. Major silicon cost reduction is achieved with the present invention over prior art video warping systems through the use of fixed size FIR filters.

BRIEF DESCRIPTION OF THE DRAWINGS

A detailed description of the preferred embodiment is provided herein below with reference to the following drawings, in which.

DETAILED DESCRIPTION OF THE ALTERNATIVE AND PREFERRED EMBODIMENTS

In the description below, the preferred and alternative embodiments apply equally to the warping of pixels and/or lines. The same inventive principles can be used to temporally warp frames by substituting frames stores for each register in FIGS. 2 and 4. Furthermore, the invention is not limited to video image warping. For example, in the case of one-dimensional warping, the principles of the present invention may be applied to audio rather than video samples (eg. to correct jitter on a digital audio tape drive).

As discussed above, digital warping of an image is specified by target pixel spacing with respect to source pixel spacing. The horizontal space between each target pixel and the vertical space between each target line must be specified by the user. Likewise, the temporal spacing (ie. time) between successive frames of an image must be user specified. This detailed information provides a very fine level of control that can be used to create very complex warps. The generation of user defined target spacing is known in the art, and does not form part of the present invention. The system of the present invention receives as inputs a stream of source pixels (and/or lines and/or frames) and the desired target increment (TarInc) which defines the user-specified spacing.

Figure 1:
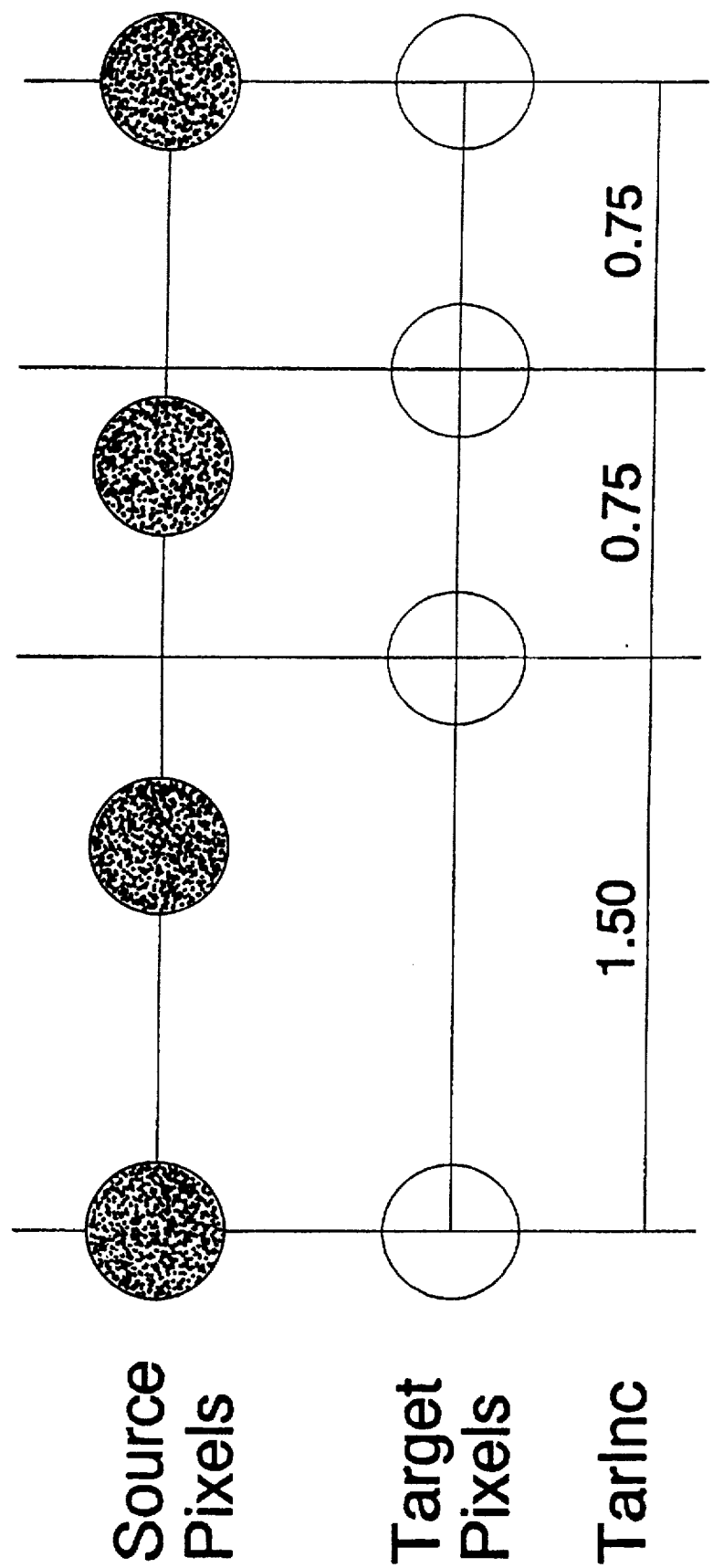
FIG. 1 shows a plurality of target pixels derived from a plurality of source pixels, wherein the target pixels are spaced according to the user defined target increment.

FIG. 1 illustrates the generation of target pixels from source pixels based on a user defined target increment (TarInc). For simplicity, the remainder of this disclosure will refer to the generation of target pixels from source pixels, it being understood that exactly the same methodology and circuitry applies to vertical processing by substituting video lines for pixels and temporal processing by substituting video frames for pixels.

As can be seen from FIG. 1, the first and last target pixels of a warped image are spatially aligned with the first and last source pixels. However, the spacing of the intermediate target pixels is defined by the target increment (TarInc). Specifically, in the example shown in FIG. 1, the first (i.e. left-most) intermediate target pixel is spaced from the first target pixel by an amount equal to 1.5 times the spacing between the source pixels, the second intermediate target pixel is spaced from the first intermediate target pixel by an amount equal to 0.75 times the spacing between the source pixels, while the last target pixel is separated from the second intermediate target pixel by an amount equal to 0.75 times the spacing between the source pixels, for a total spacing of 3.0 (i.e. the spacing between the first and last source pixels).

Figure 2:
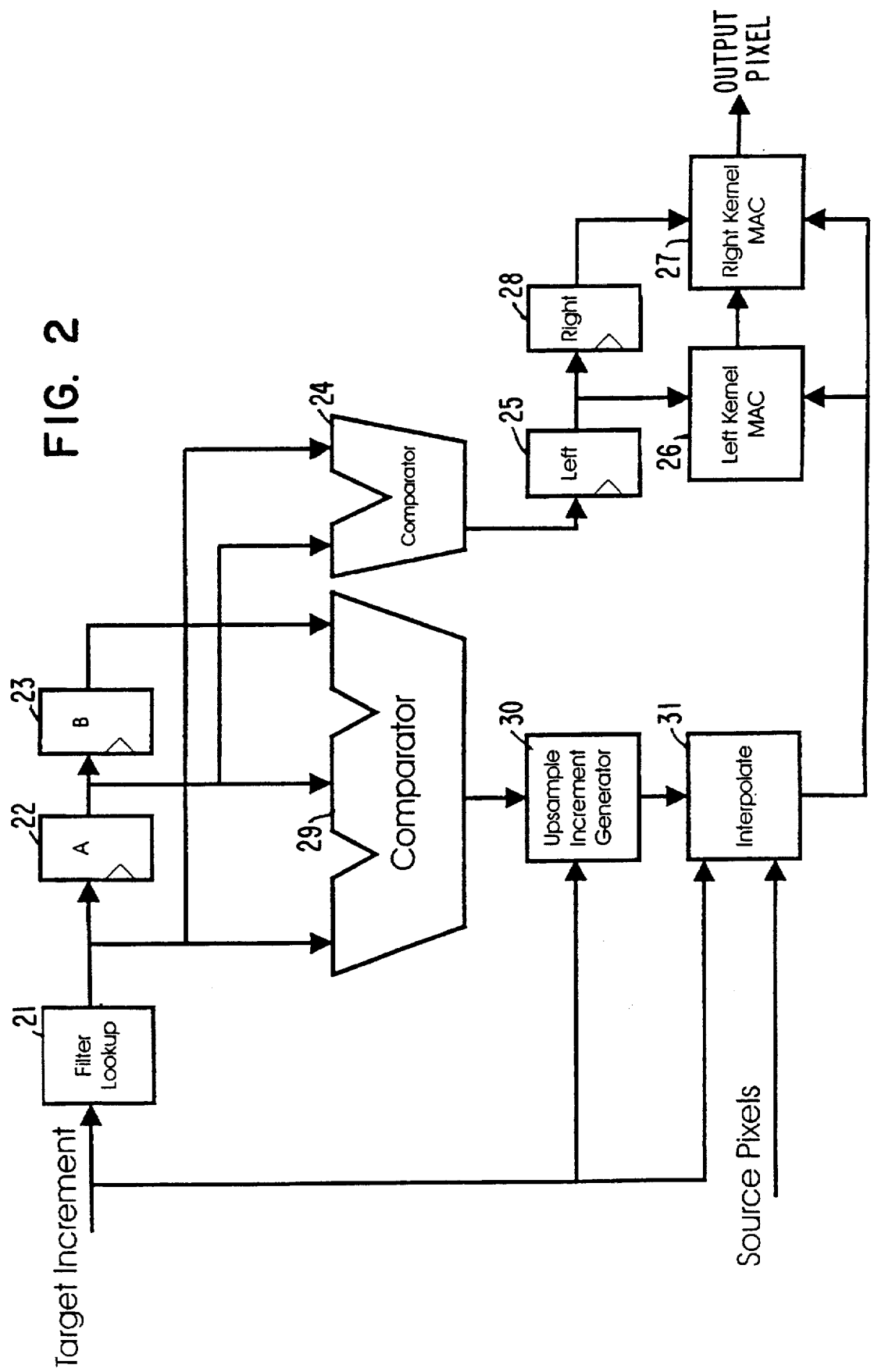
FIG. 2 is a block diagram showing functional components of the digital image warping system according to the present invention.

Turning now to FIG. 2, a functional block diagram is shown according to a first embodiment of the invention for generating a stream of warped output pixels from a stream of source pixels in accordance with dynamically varying target increments.

Firstly, the target increment (TarInc) is mapped via filter look-up table 21 to a specific FIR filter size as represented by a filter factor value based on the mapping shown in Table A, below. The FIR coefficients can be stored in a read-only table (i.e. ROM) or can be supplied by the user. Programming the coefficients gives the user the flexibility to tune the FIR filters. The filter size is chosen by indexing the filter look-up table based on TarInc. It is important to note that Table A is only an example of one implementation. This table could be extended to support any size of TarInc and generate any filter size and filter factor.

TABLE A

| TarInc (t) | FIR Filter Table and Filter Factor | | | | | |
|---|---|---|---|---|---|---|
|  | 0<t<1 | 1<t<2 | 2<t<4 | 4<t<8 | 8<t<16 | 16<t<32 |
| Filter Size | 3 Tap | 5 Tap | 9 Tap | 17 Tap | 33 Tap | 65 Tap |
| Filter Factor | 0 | 1 | 2 | 3 | 4 | 5 |

Figure 3:
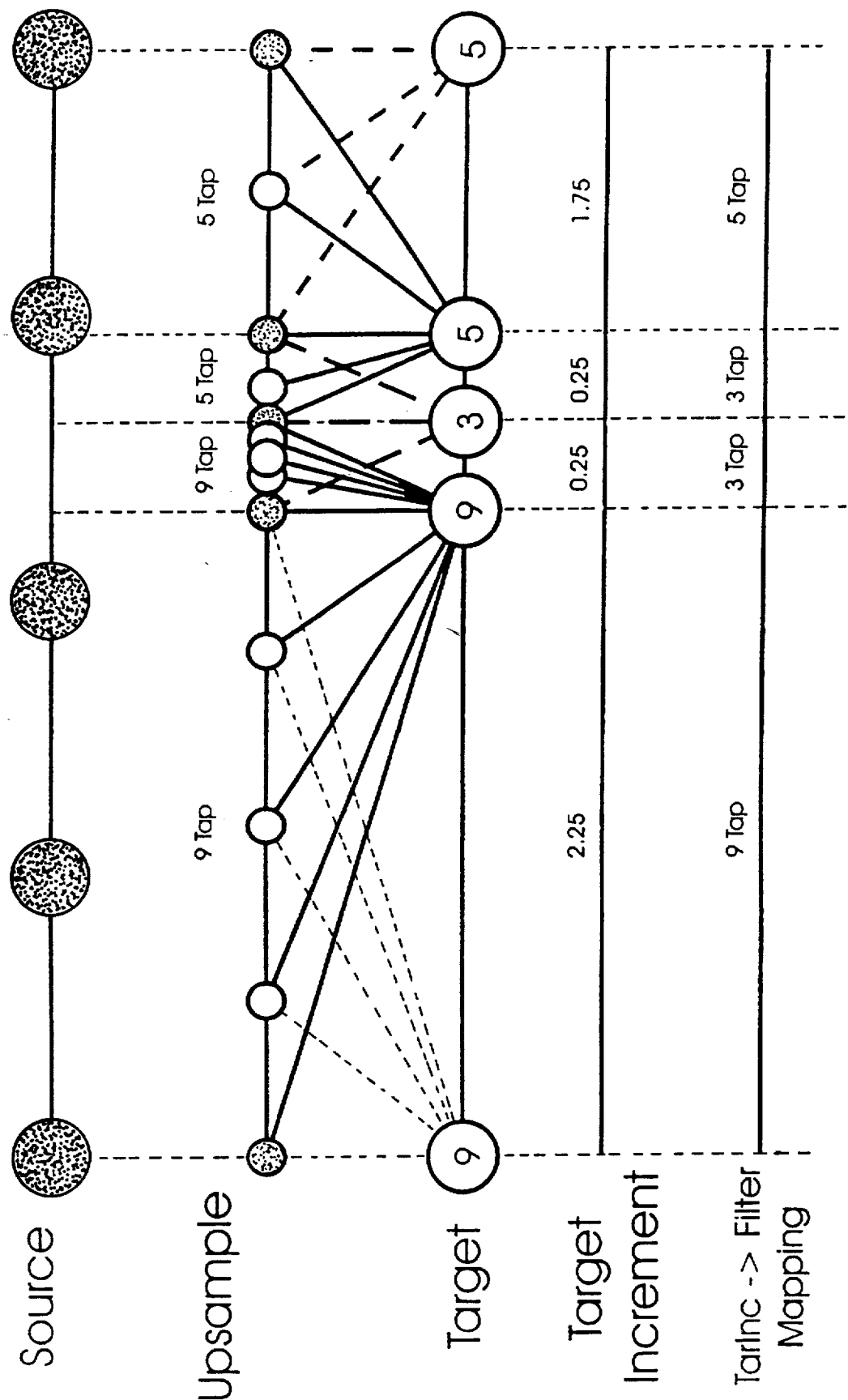
FIG. 3 shows the relative spatial positioning of source and target pixels for dynamically varying user defined target increments, and the selection of appropriate FIR filters for generating the target pixels using the system of FIG. 2, according to a representative example.

Once TarInc is mapped, the largest filter on either side of a target pixel is chosen as the filter for that pixel. FIG. 3 illustrates this step. The fifth line of FIG. 3 (TarInc® Filter Mapping) shows the TarInc values from the fourth line (Target Increment) mapped to various FIR filters based on the mapping of Table A, above. This is represented schematically in FIG. 3 by placing the largest filter size (i.e. number of taps) of the filter sizes appearing on each side of the target pixel inside the target pixel, indicating that it is the chosen filter for that pixel. In FIG. 3, the third line (Target) shows the first target pixel being generated by a 9 Tap filter, the second target pixel being generated by a 9 Tap filter, the third target pixel being generated by a 3 Tap filter, etc.

As discussed above, TarInc is mapped to an FIR filter size according to the mapping Table A, via filter look-up table 21, the output of which (i.e. filter factor value) is stored successively in A and B registers 22 and 23, respectively, on successive clock cycles, thereby forming a pipeline. Comparator 24 determines which of two adjacent filters on each side of a target pixel is the larger, and stores a representation on this filter (i.e. the associated filter factor) in the left register 25 connected to the output of comparator 24. The left kernel MAC 26 (i.e. multiplier accumulator) reads the filter factor value stored in left register 25 and generates half of the target pixel value using the left half of the designated filter kernel. On the next clock cycle, the right kernel MAC 27 generates the rest of the target pixel value using the right half of the filter kernel and the centre tap stored in right register 28, and sums the resulting value with the output value received from left kernel MAC 26, resulting in the warped output pixel.

Before dynamic filtering can take place as discussed above in connection with comparator 24, the left and right registers 25 and 28, and left and right kernel MACs 26 and 27, the correct number of upsampled pixels must be generated. Referring again to FIG. 2, the number of upsampled pixels is determined by the largest filter size stored before and after A and B registers 22 and 23.

Comparator 29 determines the largest filter size (i.e. largest filter factor output from filter look-up table 21) and transmits that value to an upsample increment generator 30. The upsample increment generator 30 receives and right-shifts the TarInc value by a predetermined number of bits equivalent to the received filter factor to produce an upsample increment value. For the example of FIG. 3, the first target increment is 2.25, resulting in a filter factor of two which corresponds to a "divide-by-four" operation (i.e. right-shift TarInc by two bits resulting in an upsample increment of 0.5625). The upsample increment value (i.e. right-shifted TarInc value) represents the correct equal spacing of upsampled pixels for application to the required size of FIR filter (e.g. 9-Tap filter for TarInc=2.25).

Interpolator 31 reads the upsample increment value and interpolates upsampled pixels from the source pixels on a continuous basis and with the spacing defined by the upsample increment value, until an internal incrementor or counter value reaches TarInc. For the example discussed above and shown in FIG. 3, four upsampled pixels are generated with the spacing of 0.5625 relative to the source pixel spacing, for application to the 9 Tap FIR filter. The interpolator 31 may be implemented as a well known linear interpolator, a quadratic interpolator as disclosed in applicant's co-pending application Ser. No. 08/172,065, or any other suitable design of interpolator.

The upsampled pixels generated by interpolator 31 are transmitted to the left and right kernel MACs 26 and 27 which contain control logic to ensure that the correct coefficient is multiplied by the correct upsampled pixel. Thus, in FIG. 3, line 2 (Upsample) depicts the largest possible number of required upsampled pixels for the different sized FIR filters implemented to generate the target pixels. The FIR filters shown operating between lines 2 and 3 of FIG. 3 are implemented by left and right half kernel MACs 26 and 27 which multiply the correct coefficients by the correct upsampled pixel values. The internal control logic of the left and right kernel MACs 26 and 27 ensures that predetermined ones of the upsampled pixels are skipped for correct matching of coefficients and upsampled pixels. For example, whereas the 9 Tap FIR filter utilized to generate the first intermediate target pixel utilizes all of the upsampled pixels from line 2, the adjacent 3 Tap filter utilizes only the fifth, ninth and eleventh generated upsampled pixels, and skips the sixth, seventh, eighth and tenth upsampled pixels, etc.

The control logic of left and right kernel MACs 26 and 27 also generates the first target pixel on start up of the system by doubling the right half kernel values for the first target pixel, as described in our copending application Ser. No. 08/126,388. The last target pixel is generated by doubling the left kernel values. This doubling is required to ensure that all FIR coefficients maintain unity gain.

Figure 4:
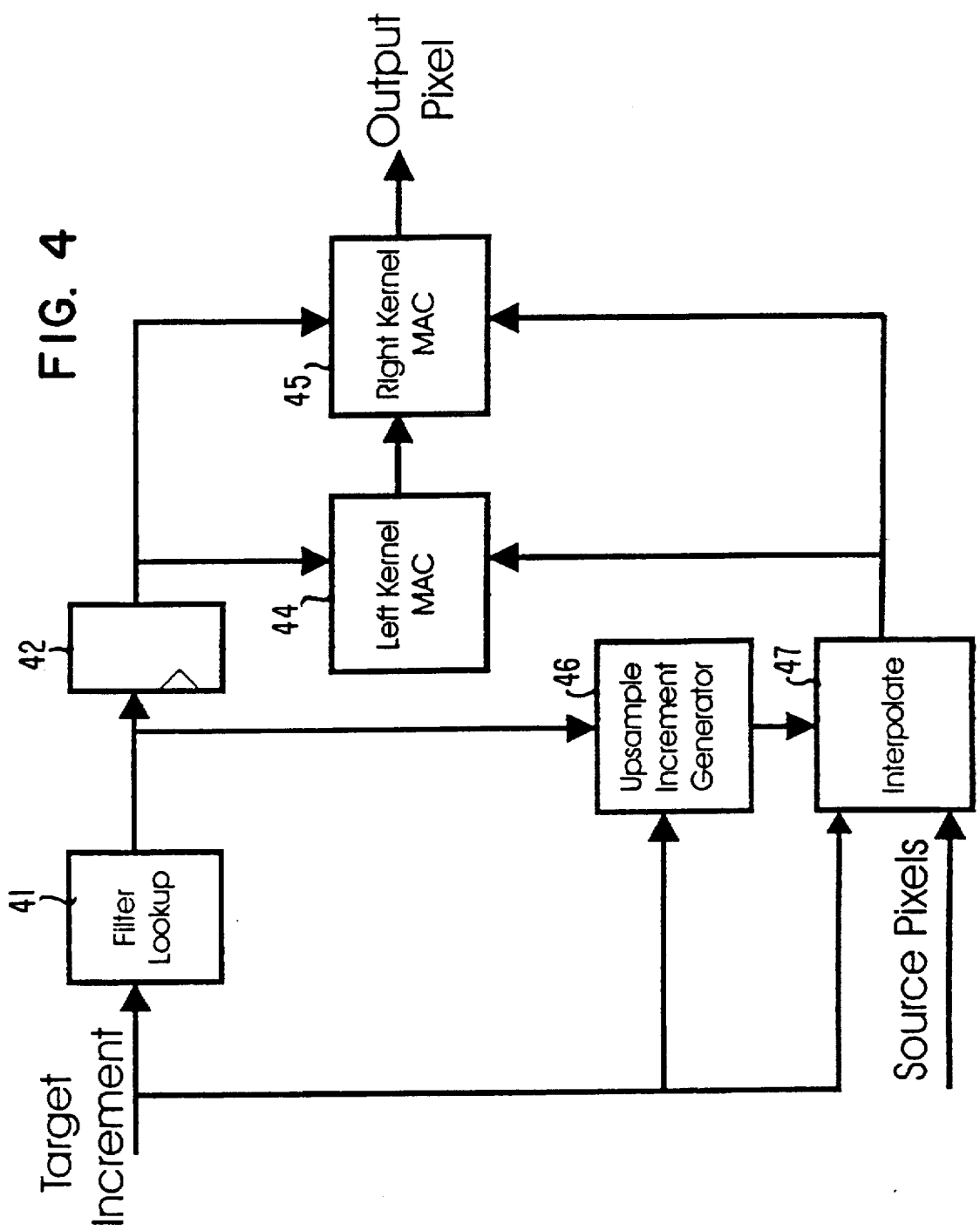
FIG. 4 is a block diagram showing functional components of the digital image warping system according to the preferred embodiment of the present invention.

Turning now to FIG. 4, a functional block diagram is shown according to the preferred embodiment for generating a stream of warped output pixels from a stream of source pixels in accordance with dynamically varying target increments.

Firstly, the target increment (TarInc) is mapped via filter look-up table 41 to a specific FIR filter size as represented by a filter factor value based on the mapping shown in Table A, above. The FIR coefficients can be stored in a read-only table (i.e. ROM) or supplied by the user. The filter size is chosen by indexing the coefficient table based on TarInc. It is important to note that Table A is only an example of an implementation. This table could be extended to support any size TarInc and generate any Filter size and Filter factor.

Figure 5:
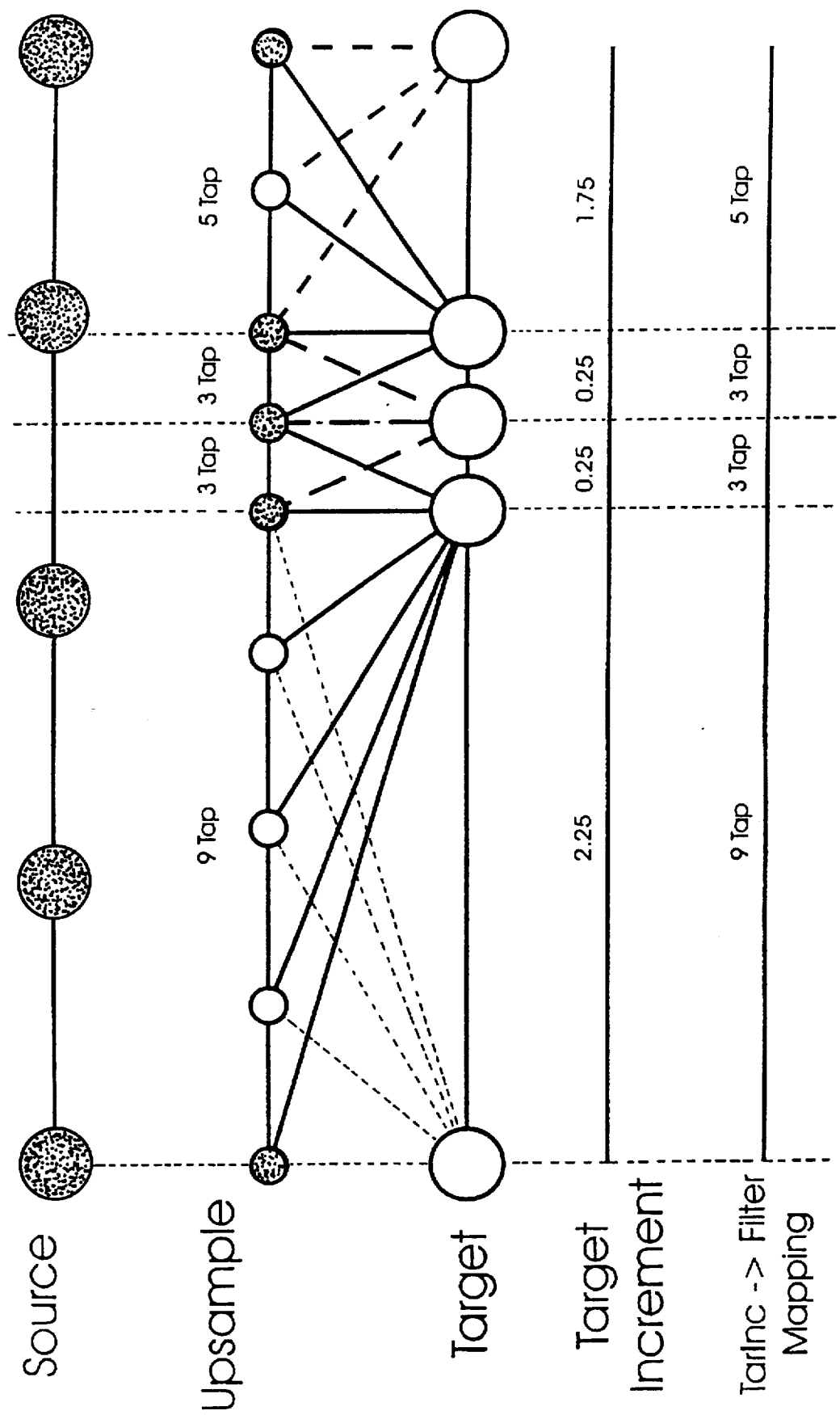
FIG. 5 shows the relative spatial positioning of the source and target pixels for dynamically varying user defined target increments, and the selection of appropriate FIR filters for generating the target pixels using the preferred embodiment of FIG. 4.

Once TarInc is mapped, the filter size is held in a register 42 and fed to the left and right kernel multiplier-accumulators 44 and 45. FIG. 5 illustrates this step. The fifth line of FIG. 5 (TarInc® Filter Mapping) shows the TarInc values from the fourth line (Target Increment) mapped to various FIR filters based on the mapping of Table A, above. This is represented schematically in FIG. 5 by placing the size of the respective half kernel of the assymetrical filter on each side of the target pixel, indicating respective half kernels for that pixel. In FIG. 5, the third line (Target) shows the first target pixel being generated by a 9 Tap filter, the second target pixel being generated by an assymetrical filter being one-half of a 9 Tap filter and one-half of a 3 Tap filter, the third target pixel being generated by a 3 Tap filter, and the fourth target pixel being generated by an assymetrical filter being one-half of a 3 Tap filter and one-half of a 5 Tap filter.

As discussed above, TarInc is mapped to an FIR filter size according to the mapping Table A, via filter look-up table 41, the output of which (i.e. filter factor value) is stored successively in register 42. The left kernel MAC 44 (i.e. multiplier accumulator) reads the filter factor value stored in register 42 and generates half of the target pixel value and a first contribution to the center tap product value using the left half of the designated filter kernel and the center tap for the left-side half kernel. On the same clock cycle, the right kernel MAC 45 generates the other half of the target pixel value and a second contribution to the center tap product value using the right half of the filter kernel and the center tap for right-side half kernel. The right kernel MAC 45 then sums the first and second contributions to the center tap multiplication product and divides that summed value by two for obtaining an averaged center tap multiplication product, and finally sums the averaged center tap multiplication product with the left half of the target pixel value received from left kernel MAC 44 and the right half of the target pixel value, resulting in the final warped output pixel.

As an alternative to summing the first and second contributions to the center tap multiplication product and dividing that summed value by two, the center tap coefficient for each half kernel may simply be halved prior to storage in the associated coefficient ROM of left and right kernel MACs 44 and 45, or via the appropriate code where the invention is implemented in software.

The upsample increment generator 46 receives and right-shifts the TarInc value by a predetermined number of bits equivalent to the received filter factor to produce an upsample increment value. For the example of FIG. 5, the first target increment is 2.25, resulting in a filter factor of two which corresponds to a "divide-by-four" operation (i.e. right-shift TarInc by two bits resulting in an upsample increment of 0.5625). The upsample increment value (i.e. right-shifted TarInc value) represents the correct equal spacing of upsampled pixels for application to the required size of FIR filter (e.g. 9-Tap filter for TarInc=2.25).

Interpolator 47 reads the upsample increment value and interpolates upsampled pixels from the source pixels on a continuous basis and with the spacing defined by the upsample increment value, until an internal incrementor or counter value reaches TarInc. For the example discussed above and shown in FIG. 5, four upsampled pixels are generated with the spacing of 0.5625 relative to the source pixel spacing, for application to the 9 Tap FIR filter. The interpolator 3 may be implemented as a well known linear interpolator, a quadratic interpolator as disclosed in applicant's co-pending application Ser. No. 08/172,065, or any other suitable design of interpolator.

The upsampled pixels generated by interpolator 47 are transmitted to the left and right kernel MACs 44 and 45 which contain control logic to ensure that the correct coefficient is multiplied by the correct upsampled pixel. The FIR filters shown operating between lines 2 and 3 of FIG. 5 are implemented by left and right half kernel MACs 44 and 45 which multiply the correct coefficients by the correct upsampled pixel values.

The control logic of left and right kernel MACs 44 and 45 also generates the first target pixel on start up of the system by doubling the right half kernel values for the first target pixel, in the manner disclosed in application Ser. No. 08/126,388. The last target pixel is generated by doubling the left kernel values. This doubling is required to ensure that all FIR filters maintain unity gain.

Other embodiments and variations of the invention are possible. For example, according to a further alternative embodiment, the invention is implemented in software using C programming language. This alternative software embodiment is fully disclosed in Appendix "A" to this disclosure. Although the warping performed in accordance with the preferred embodiment has been described as providing proper Nyquist bandlimiting, special effect warping can also be implemented using the principles of the present invention without Nyquist bandlimiting (eg. soft focus warping). In other words, the pre-filtering and interpolations steps can be implemented without Nyquist band-limiting. All such alternative embodiments and variations are believed to be within the sphere and scope of the claims appended hereto.

APPENDIX "A"

WARP.CPP

```
1://
2:// Vertical and Horizontal Genesis Warping Software 1.0
3://
4:// This program warps an input Targa file in both dimensions based on two
5:// accompanying vertical and horizontal Warp Containment Files.
6://
7:// Program Name: WARP.CPP
8://
9:// Author: James D. E. Goel
10://
11://     - Initial release of the software.
12://     If you have any problems, please contact me.
13://
14:// Copyright (c)   1993 Genesis Microchip Inc.
15://                 200 Town Centre Blvd., Suite 400
16://                 Markham, Ontario
17://                 L3R 8G5
18://                 (905) 470-2742
19://
20://  All rights reserved.
21://
22:// Modifications:
23://
24:// Aug. 18, 1994  - James Goel
25://                - Initial release
26://
27:// Setup standard C definitions
28://
29:#include <stdio.h>
30:#include <stdlib.h>
31:#include <math.h>
32:#include <string.h>
33:#include <assert.h>
34:#include <afx.h>
35:#include "image.h"
36:#include "logic.h"
37:
38://
39:// Create a number of useful type definitions
40://
41:typedef unsigned char BYTE;
42:typedef unsigned char PIXEL;
43:typedef unsigned long ULONG;
44:typedef unsigned int UINT;
45:
46://
47:// This header structure is used to define a
48:// simple binary format for reading and storing
49:// image data.
50://
51:typedef struct image_hdr
52:{
53:  //
54:  // Image Width and Height
55:  //
56:  unsigned int Width;
57:  unsigned int Height;
58:  //
59:  // Image type
60:  // There are various different Genesis define
61:  // images types:
62:  // 0 = Red Pixels
63:  // 1 = Green Pixels
64:  // 2 = Blue Pixels
65:  // 3 = Luma Pixels
66:  // 4 = Chroma (U/V time multiplexed)
67:  // 5 = Black & White Pixels
68:  //
69:  int image_type;
70:} Genesis_Header;
71:
72://
73:// This header structure is used to provide a
74:// simple and consistent method for parsing
75:// command line parameters.
76://
77:typedef struct cmd_line_tag
78:{
```

WARP.CPP

```
 79: char    pchVTarInc[13];// Vertical warp containment field (VTarInc)
 80: char    pchHTarInc[13];// Horizontal warp containment field (HTarInc)
 81: char    pchSrc[13];    // Image to be warped
 82: char    pchWarp[13];   // Output warped image
 83:} tCmd_Line;
 84:
 85://
 86:// ********************************************
 87:// usage -- Prints appropriate command line usage
 88:// ********************************************
 89://
 90:void Usage()
 91:{
 92:     //
 93:     // Print out the proper usage
 94:     //
 95: printf ( "ERROR: Incorrect command line parameters.\n");
 96: printf ( "Usage: WARP  -v [Vertical Warp Containment File] ");
 97: printf ( "-h [Horizontal Warp Containment File]\n");
 98: printf ( "             -w [Image to be Warped] ");
 99: printf ( "-o [Output Warped Filename]\n");
100: printf ( "Please do not use any wild card characters.\n\n");
101:}
102://
103:// ********************************************
104:// Parse_Cmd -- Parses the command line parameters
105:// ********************************************
106://
107:void Parse_Cmd( int argc, char *argv[], tCmd_Line *psCmd_Line)
108:{
109: CFileException* theException = new CFileException;
110: int    CurrArg=0;         // Command line argument counter
111: //
112: // IF there are no arguments supplied to the main line program, THEN
113: //
114: if (argc == 1)
115: {
116:     //
117:     // Print usage information
118:     //
119:     Usage();
120:     THROW( theException );
121: //
122: // END IF -- file arguments
123: //
124: }
125: //
126: // WHILE reading through the command line arguments,
127: //
128: while ( ++CurrArg < argc )
129: {
130:     //
131:     // IF the input switches do not use dashes (-), THEN
132:     //
133:     if ( argv[CurrArg][0] != '-' )
134:     {
135:         //
136:         //* Pring usage information
137:         //
138:         Usage();
139:         THROW( theException );
140:     //
141:     // END IF -- input switches
142:     //
143:     }
144:     //
145:     // SWITCH ON: command line switches
146:     //
147:     switch ( argv[CurrArg][1] )
148:     {
149:         //
150:         // ON CASE: Vertical Warp Containment filename
151:         //
152:         case 'V':
153:         case 'v':
154:             //
155:             // Copy the warp containment filename
156:             //
```

WARP.CPP

```
157:          strcpy( psCmd_Line->pchVTarInc, argv[++CurrArg] );
158:       //
159:       // END CASE -- Copy Straight Grid Filename
160:       //
161:       break;
162:       //
163:       // ON CASE: Horizontal Warp Containment filename
164:       //
165:       case 'H':
166:       case 'h':
167:          //
168:          // Copy the warp containment filename
169:          //
170:          strcpy( psCmd_Line->pchHTarInc, argv[++CurrArg] );
171:       //
172:       // END CASE -- Copy Straight Grid Filename
173:       //
174:       break;
175:       //
176:       // ON CASE: Image to be warped
177:       //
178:       case 'W':
179:       case 'w':
180:          //
181:          // Copy source image filename
182:          //
183:          strcpy( psCmd_Line->pchSrc, argv[++CurrArg] );
184:       //
185:       // END CASE -- Copy source image filename
186:       //
187:       break;
188:       //
189:       // ON CASE: Output warped image
190:       //
191:       case 'O':
192:       case 'o':
193:          //
194:          // Copy output warped image filename
195:          //
196:          strcpy( psCmd_Line->pchWarp, argv[++CurrArg] );
197:       //
198:       // END CASE -- Output warped image
199:       //
200:       break;
201:       //
202:       // ON CASE DEFAULT: Show proper command line usage
203:       //
204:       default:
205:          //
206:          // Print proper usage
207:          //
208:          Usage();
209:          THROW( theException );
210:       //
211:       // END CASE -- default
212:       //
213:       break;
214:    //  .
215:    // END SWITCH
216:    //
217:    }
218: //
219: // END WHILE
220: //
221: }
222://
223:// End Parse Command Line
224://
225:}
226://
227://*******************************************************************
228:// Main program loop
229://*******************************************************************
230://
231:void main(int argc, char *argv[])
232:{
233: // Exception object for debugging
234: CFileException* theException = new CFileException;
```

WARP.CPP

```
235:  Image       SrcImage;          // Source image to be warped
236:  Image       TarImage;          // Output warped image
237:  Pixel       VUpPixel;          // Vertical Up sampled pixel
238:  Pixel       VFiltPix;          // Vertical Filtered pixel
239:  LeftKernel  VLeftKernel;       // Vertical Left FIR Filter Kernel MAC
240:  RightKernel VRightKernel;      // Vertical Right FIR Filter Kernel MAC
241:  FILE        *pfVTarInc;        // File pointer to the Vertical TarInc
242:  UINT        iVTarIncWidth;     // Width of the the containment file
243:  UINT        iVTarIncHeight;    // Height of the containment file
244:  UINT        iTarType;          // *** Reserved for future expansion ***
245:  float       *pVTarIncLine;     // Pointer to a vertical warp TarInc
246:  float       *pVTarIncLineTmp;  // Copy of the previous pointer
247:  tCmd_Line   sCmd_Line;         // Holds the command line parameters
248:  LOOKUP      VFiltLookup;       // Maps the Vert TarInc to FIR filter size
249:  IncGen      VUpIncGen;         // Object to generate a Vertical Up Sample increment size
250:  Interpolate VInterpolator;     // Object to generate an interpolated vertical up-sampled pixel
251:  BYTE        *pSrcCol;          // Pointer to a source image column
252:  BYTE        *pTarCol;          // Pointer to a target image column
253:  BYTE        *pTarColTmp;       // Copy of the previous pointer
254:  UINT        iColumn;           // Counts the number of columns in the input image
255:  UINT        iCount;            // Counts the number of output pixels generated
256:  //
257:  // Print introduction
258:  //
259:  fprintf ( stderr, "\n\nWARP FAST! Generates a warped Targa file.  Aug-23-1994\n");
260:  fprintf ( stderr, "Copyright(c) 1994 Genesis Microchip. All Rights Reserved\n");
261:  fprintf ( stderr, "Author: James Goel\n\n");
262:  //
263:  // Parse the command line parameters
264:  // Load the command line parameters into the command line
265:  // structure
266:  //
267:  TRY
268:  {
269:      Parse_Cmd( argc, argv, &sCmd_Line );
270:  }
271:  CATCH( CException, theException )
272:  {
273:      TRACE( "Exception: Error during command parsing phase...\n" );
274:      exit(1);
275:  }
276:  END_CATCH
277:  //
278:  // ************************************************************
279:  // VERTICAL WARPING ALGORITHM
280:  // ************************************************************
281:  //
282:  // Open the Vertical Warp Containment file (TarInc) file
283:  // IF the TarInc file could not be opened, THEN:
284:  //
285:  if( (pfVTarInc=fopen( sCmd_Line.pchVTarInc, "rb" )) == NULL )
286:  {
287:      //
288:      // Print an error message and abort
289:      //
290:      fprintf( stderr, "Could not open the Vertical Warp Containment file.\n");
291:      fprintf( stderr, "Please correct this problem and try again.\n");
292:      exit(0);
293:  //
294:  // END IF
295:  //
296:  }
297:  //
298:  // Read the Width and Height of the Vertical TarInc file
299:  //
300:  fread( &iVTarIncWidth, sizeof(UINT), 1, pfVTarInc );
301:  fread( &iVTarIncHeight, sizeof(UINT), 1, pfVTarInc );
302:  //
303:  // Read the type of Vertical TarInc file
304:  // (Used for future expansion)
305:  //
306:  fread( &iTarType, sizeof(UINT), 1, pfVTarInc );
307:  //
308:  // Allocate memory to hold one line of Vertical TarInc values
309:  // IF the line could not be allocated, THEN:
310:  //
311:  if( (pVTarIncLine = (float *)malloc(sizeof(float)*iVTarIncWidth)) == NULL)
312:  {
```

WARP.CPP

```
313:    //
314:    // Print error message and abort
315:    //
316:    fprintf( stderr, "Could not allocate memory for the Vertical TarInc line.\n");
317:    exit(1);
318:    };
319:    //
320: // Open and load the input Targa File
321: //
322: TRY
323: {
324:    SrcImage.Load( sCmd_Line.pchSrc );
325: }
326: CATCH( CException, theException )
327: {
328:    TRACE( "Error while loading the Source Image.\n" );
329:    fcloseall();
330:    exit(1);
331: }
332: END_CATCH
333: //
334: // Verify that the width of the Containment file is 1 less
335: // than the width of the source Targa file. This ensures
336: // that only the spaces between the input Targa lines get
337: // resized.
338: //
339: assert( iVTarIncWidth == SrcImage.Height() - 1 );
340: //
341: // Verify that both VTarInc and the Source image have the
342: // same number of columns
343: //
344: assert( iVTarIncHeight == SrcImage.Width() );
345: //
346: // Print status message
347: //
348: fprintf( stderr, "Loading source image..[%s]\n", sCmd_Line.pchSrc );
349: //
350: // Allocate enough memory for the output Vertical Warp file
351: //
352: TRY
353: {
354:    TarImage.Create( SrcImage.Width(), SrcImage.Height() );
355: }
356: CATCH( CException, theException )
357: {
358:    TRACE( "Error while allocating space for the Target Warp Image.\n" );
359:    fcloseall();
360:    exit(1);
361: }
362: END_CATCH
363: //
364: // LOOP for the number of vertical columns in the Containment Field
365: //
366: for( iColumn=0; iColumn < iVTarIncHeight; iColumn++)
367: {
368:    //
369:    // Read in a Vertical Tar Inc Line
370:    //
371:    fread( pVTarIncLine, sizeof(float), iVTarIncWidth, pfVTarInc );
372:    //
373:    // Read a source image column
374:    //
375:    pSrcCol = SrcImage.GetColumn(iColumn);
376:    //
377:    // Load the source image column into the VInterpolator
378:    //
379:    VInterpolator.SetSrc( pSrcCol );
380:    //
381:    // Get a target image column that will be loaded with
382:    // warped image pixels.
383:    //
384:    pTarCol = TarImage.GetColumn(iColumn);
385:    //
386:    // Initialize the VInterpolator and make copies of the
387:    // pointers to both the TarInc and Target image files
388:    //
389:    VInterpolator.Reset();
390:    VInterpolator.iTarIncWidth = iVTarIncWidth;
```

WARP.CPP

```
391:    pVTarIncLineTmp = pVTarIncLine;
392:    pTarColTmp = pTarCol;
393:    //
394:    // Print working line number
395:    //
396:    fprintf( stderr, "Working on column...[%d]\n", iColumn );
397:    //
398:    // Reset the Right Vertical MAC
399:    //
400:    VRightKernel.Reset();
401:    //
402:    // LOOP for the number of TarInc values in the Vertical Containment Field
403:    //
404:    for( iCount=0; iCount < iVTarIncWidth; iCount++ )
405:    {
406:       //
407:       // Reset the Left Vertical MAC
408:       //
409:       VLeftKernel.Reset();
410:       //
411:       // Calculate the correct Vertical Filterfactor based on TarInc
412:       //
413:       VFiltLookup.fTarInc = *pVTarIncLineTmp;
414:       //
415:       // Load the current VTarInc into the Vertical Upsample Increment Generator
416:       // Load the correct Vertical Filter Factor into the Upsample Increment Generator
417:       //
418:       VUpIncGen.fTarInc = *pVTarIncLineTmp;
419:       VUpIncGen.FiltFact = VFiltLookup.Out();
420:       //
421:       // Load the current TarInc into the VInterpolator
422:       // Load the Filter Factor into the VInterpolator
423:       // Load the Upsample Increment into the VInterpolator
424:       //
425:       VInterpolator.fTarInc = *pVTarIncLineTmp++;
426:       VInterpolator.FiltFact = VFiltLookup.Out();
427:       VInterpolator.UpInc = VUpIncGen.Out();
428:       //
429:       // Load the Filter Factor into the MACs
430:       //
431:       VLeftKernel.FiltFact = VFiltLookup.Out();
432:       VRightKernel.FiltFact = VFiltLookup.Out();
433:       //
434:       // IF the output pixel is a top edge pixel, THEN:
435:       //
436:       if( iCount==0 )
437:          //
438:          // Double the Left filter kernel coefficients
439:          //
440:          VRightKernel.Double=TRUE;
441:       //
442:       // ELSE IF the output pixel is a bottom edge pixel, THEN:
443:       //
444:       else if( iCount==iVTarIncWidth-1 )
445:          //
446:          // Double the Right filter kernel coefficients
447:          //
448:          VLeftKernel.Double=TRUE;
449:       //
450:       // ELSE if the output pixel is somewhere in the middle of the image, THEN:
451:       //
452:       else
453:       {
454:          //
455:          // Do not double either Right or Left kernel
456:          //
457:          VLeftKernel.Double=FALSE;
458:          VRightKernel.Double=FALSE;
459:       }
460:       //
461:       // END IF -- output pixel is on an edge
462:       //
463:       //
464:       // Calculate the center tap Kernel values
465:       //
466:       VLeftKernel.MAC( VInterpolator.UpPix );
467:       VRightKernel.MAC( VInterpolator.UpPix );
468:       //
```

WARP.CPP

```
469:        // LOOP through the other FIR filter taps
470:        //
471:        while( VInterpolator.CenterTap() != TRUE )
472:        {
473:            //
474:            // Generate an interpolated pixel
475:            // Filter the interpolated pixel
476:            //
477:            VUpPixel = VInterpolator.Generate();
478:            VLeftKernel.MAC( VUpPixel );
479:            VRightKernel.MAC( VUpPixel );
480:        //
481:        // END LOOP -- other FIR filter taps
482:        //
483:        };
484:        //
485:        // Write the Right Kernel Output Pixel to the output line store
486:        //
487:        VFiltPix = VRightKernel.FilterPixel();
488:        *(pTarColTmp++) = VFiltPix.Red;
489:        *(pTarColTmp++) = VFiltPix.Grn;
490:        *(pTarColTmp++) = VFiltPix.Blu;
491:        //
492:        // Check to make sure that the Target Line stays within output image range
493:        //
494:        assert( (UINT) (pTarColTmp-pTarCol-1) < TarImage.Width()*3 );
495:        //
496:        // Transfer the Left Kernel to the Right Kernel
497:        //
498:        VRightKernel.AccumRed=VLeftKernel.AccumRed;
499:        VRightKernel.AccumGrn=VLeftKernel.AccumGrn;
500:        VRightKernel.AccumBlu=VLeftKernel.AccumBlu;
501:    //
502:    // END LOOP -- TarInc values from Containment File
503:    //
504:    }
505:    //
506:    // Write Left Kernel Output Pixel to the output line store
507:    //
508:    VFiltPix = VLeftKernel.FilterPixel();
509:    *(pTarColTmp++) = VFiltPix.Red;
510:    *(pTarColTmp++) = VFiltPix.Grn;
511:    *(pTarColTmp++) = VFiltPix.Blu;
512:    //
513:    // Check to make sure that the Target Line stays within range
514:    //
515:    assert( (UINT) (pTarColTmp-pTarCol-1) < TarImage.Width()*3 );
516:    //
517:    // Write the Output Pixel line to disk
518:    //
519:    TRY
520:    {
521:        TarImage.PutColumn( pTarCol, iColumn );
522:    }
523:    CATCH( CException, theException )
524:    {
525:        TRACE( "Error while writing a warped output image line.\n" );
526:        fcloseall();
527:        exit(1);
528:    }
529:    END_CATCH
530: //
531: // END LOOP -- vertical columns
532: //
533: }
534: //
535: // Save vertically warped Targa file
536: //
537: TRY
538: {
539:    TarImage.Save( "vert.tga" );
540: }
541: CATCH( CException, theException )
542: {
543:    TRACE( "Error while saving the vertically warped image\n" );
544:    fcloseall();
545:    exit(1);
546: }
```

WARP.CPP

```
547: END_CATCH
548: //
549: // Close the Vertical Tar Inc file
550: //
551: fclose(pfVTarInc);
552: //
553: // Print status message
554: //
555: fprintf( stderr, "Finished Vertical Warping...\n");
556: fprintf( stderr, "Starting Horizontal Warping...\n");
557: //
558: // ****************************************************************
559: // Horizontal WARPING ALGORITHM
560: // ****************************************************************
561: //
562: // Define all Horizontal warping variables
563: //
564: Pixel        HUpPixel;        // Horizontal Up sampled pixel
565: Pixel        HFiltPix;        // Horizontal Filtered pixel
566: Image        HSrcImage;       // Vertically Warped Source image to be Horizontally warped
567: Image        HTarImage;       // Output warped image
568: LeftKernel   HLeftKernel;     // Horizontal Left FIR Filter Kernel MAC
569: RightKernel  HRightKernel;    // Horizontal Right FIR Filter Kernel MAC
570: FILE         *pfHTarInc;      // Pointer to Horizontal Warp TarInc
571: UINT         iHTarIncWidth;   // Width of the the containment file
572: UINT         iHTarIncHeight;  // Height of the containment file
573: float        *pHTarIncLine;   // Pointer to a specific Horizontal warp containment (TarInc) line
574: float        *pHTarIncLineTmp;// Copy of the previous pointer
575: LOOKUP       HFiltLookup;     // Object to map the Horizontal TarInc to the correct FIR filter size
576: IncGen       HUpIncGen;       // Object to generate a Horizontal Up Sample increment size
577: Interpolate  HInterpolator;   // Object to generate an interpolated Horizontal up-sampled pixel
578: BYTE         *pSrcRow;        // Pointer to a source image row
579: BYTE         *pTarRow;        // Pointer to a target image row
580: BYTE         *pTarRowTmp;     // Copy of the previous pointer
581: UINT         iRow;            // Counts the number of rows in the input image
582: //
583: // Open the Horizontal Warp Containment file (TarInc) file
584: // IF the TarInc file could not be opened, THEN:
585: //
586: if( (pfHTarInc=fopen( sCmd_Line.pchHTarInc, "rb" )) == NULL )
587: {
588:     //
589:     // Print an error message and abort
590:     //
591:     fprintf( stderr, "Could not open the Horizontal Warp Containment file.\n");
592:     fprintf( stderr, "Please correct this problem and try again.\n");
593:     exit(0);
594: //
595: // END IF
596: //
597: }
598: //
599: // Read the Width and Height of the Horizontal TarInc file
600: //
601: fread( &iHTarIncWidth, sizeof(UINT), 1, pfHTarInc );
602:    fread( &iHTarIncHeight, sizeof(UINT), 1, pfHTarInc );
603:    //
604:    // Read the type of TarInc file
605:    // (Used for future expansion)
606:    //
607:    fread( &iTarType, sizeof(UINT), 1, pfHTarInc );
608:    //
609:    // Allocate memory to hold one line of Horizontal TarInc values
610:    // IF the line could not be allocated, THEN:
611:    //
612:    if( (pHTarIncLine = (float *)malloc(sizeof(float)*iHTarIncWidth)) == NULL)
613:    {
614:     //
615:     // Print error message and abort
616:     //
617:     fprintf( stderr, "Could not allocate memory for the Horizontal TarInc line.\n");
618:     exit(1);
619:    };
620:    //
621: // Open and load the Vertically warped Targa file
622: //
623: TRY
624: {
```

WARP.CPP

```
625:    HSrcImage.Load( "vert.tga" );
626: }
627: CATCH( CException, theException )
628: {
629:    TRACE( "Error while loading the Source Image.\n" );
630:    fcloseall();
631:    exit(1);
632: }
633: END_CATCH
634: //
635: // Verify that the width of the Containment file is 1 less
636: // than the width of the source Targa file. This ensures
637: // that only the spaces between the input Targa lines get
638: // resized.
639: //
640: assert( iHTarIncWidth == HSrcImage.Width() - 1 );
641: //
642: // Verify that both HTarInc and the Source image have the
643: // same number of lines
644: //
645: assert( iHTarIncHeight == HSrcImage.Height() );
646: //
647: // Allocate enough memory for the output Vertical Warp file
648: //
649: TRY
650: {
651:    HTarImage.Create( HSrcImage.Width(), HSrcImage.Height() );
652: }
653: CATCH( CException, theException )
654: {
655:    TRACE( "Error while allocating space for the Target Warp Image.\n" );
656:    fcloseall();
657:    exit(1);
658: }
659: END_CATCH
660: //
661: // LOOP for the number of Horizontal rows in the Containment Field
662: //
663: for( iRow=0; iRow < iHTarIncHeight; iRow++)
664: {
665:    //
666:    // Read in a Horizontal Tar Inc Line
667:    //
668:    fread( pHTarIncLine, sizeof(float), iHTarIncWidth, pfHTarInc );
669:    //
670:    // Read a source image row
671:    //
672:    pSrcRow = HSrcImage.GetLine(iRow);
673:    //
674:    // Load the source image row into the HInterpolator
675:    //
676:    HInterpolator.SetSrc( pSrcRow );
677:    //
678:    // Get a target image row that will be loaded with
679:    // warped image pixels.
680:    //
681:    pTarRow = HTarImage.GetLine(iRow);
682:    //
683:    // Initialize the HInterpolator and make copies of the
684:    // pointers to both the TarInc and Target image files
685:    //
686:    HInterpolator.Reset();
687:    HInterpolator.iTarIncWidth = iHTarIncWidth;
688:    pHTarIncLineTmp = pHTarIncLine;
689:    pTarRowTmp = pTarRow;
690:    //
691:    // Print working line number
692:    //
693:    fprintf( stderr, "Working on row...[%d]\n", iRow );
694:    //
695:    // Reset the Right Horizontal MAC
696:    //
697:    HRightKernel.Reset();
698:    //
699:    // LOOP for the number of TarInc values in the Horizontal Containment Field
700:    //
701:    for( iCount=0; iCount < iHTarIncWidth; iCount++ )
702:    {
```

WARP.CPP

```
703:    //
704:    // Reset the Left Horizontal MAC
705:    //
706:    HLeftKernel.Reset();
707:    //
708:    // Calculate the correct Horizontal Filterfactor based on TarInc
709:    //
710:    HFiltLookup.fTarInc = *pHTarIncLineTmp;
711:    //
712:    // Load the current HTarInc into the Horizontal Upsample Increment Generator
713:    // Load the correct Horizontal Filter Factor into the Upsample Increment Generator
714:    //
715:    HUpIncGen.fTarInc = *pHTarIncLineTmp;
716:    HUpIncGen.FiltFact = HFiltLookup.Out();
717:    //
718:    // Load the current TarInc into the HInterpolator
719:    // Load the Filter Factor into the HInterpolator
720:    // Load the Upsample Increment into the HInterpolator
721:    //
722:    HInterpolator.fTarInc = *pHTarIncLineTmp++;
723:    HInterpolator.FiltFact = HFiltLookup.Out();
724:    HInterpolator.UpInc = HUpIncGen.Out();
725:    //
726:    // Load the Filter Factor into the MACs
727:    //
728:    HLeftKernel.FiltFact = HFiltLookup.Out();
729:    HRightKernel.FiltFact = HFiltLookup.Out();
730:    //
731:    // IF the output pixel is a top edge pixel, THEN:
732:    //
733:    if( iCount==0 )
734:        //
735:        // Double the Left filter kernel coefficients
736:        //
737:        HRightKernel.Double=TRUE;
738:    //
739:    // ELSE IF the output pixel is a bottom edge pixel, THEN:
740:    //
741:    else if( iCount==iHTarIncWidth-1 )
742:        //
743:        // Double the Right filter kernel coefficients
744:        //
745:        HLeftKernel.Double=TRUE;
746:    //
747:    // ELSE if the output pixel is somewhere in the middle of the image, THEN:
748:    //
749:    else
750:    {
751:        //
752:        // Do not double either Right or Left kernel
753:        //
754:        HLeftKernel.Double=FALSE;
755:        HRightKernel.Double=FALSE;
756:    }
757:    //
758:    // END IF -- output pixel is on an edge
759:    //
760:    //
761:    // Calculate the center tap Kernel values
762:    //
763:    HLeftKernel.MAC( HInterpolator.UpPix );
764:    HRightKernel.MAC( HInterpolator.UpPix );
765:    //
766:    // LOOP through the other FIR filter taps
767:    //
768:    while( HInterpolator.CenterTap() != TRUE )
769:    {
770:        //
771:        // Generate an interpolated pixel
772:        // Filter the interpolated pixel
773:        //
774:        HUpPixel = HInterpolator.Generate();
775:        HLeftKernel.MAC( HUpPixel );
776:        HRightKernel.MAC( HUpPixel );
777:    //
778:    // END LOOP -- other FIR filter taps
779:    //
780:    };
```

WARP.CPP

```
781:    //
782:    // Write the Right Kernel Output Pixel to the output line store
783:    //
784:    HFiltPix = HRightKernel.FilterPixel();
785:    *(pTarRowTmp++) = HFiltPix.Red;
786:    *(pTarRowTmp++) = HFiltPix.Grn;
787:    *(pTarRowTmp++) = HFiltPix.Blu;
788:    //
789:    // Check to make sure that the Target Line stays within output image range
790:    //
791:    assert( (UINT) (pTarRowTmp-pTarRow-1) < HTarImage.Width()*3 );
792:    //
793:    // Transfer the Left Kernel to the Right Kernel
794:    //
795:    HRightKernel.AccumRed=HLeftKernel.AccumRed;
796:    HRightKernel.AccumGrn=HLeftKernel.AccumGrn;
797:    HRightKernel.AccumBlu=HLeftKernel.AccumBlu;
798: //
799: // END LOOP -- TarInc values from Containment File
800: //
801:    }
802:    //
803:    // Write Left Kernel Output Pixel to the output line store
804:    //
805:    HFiltPix = HLeftKernel.FilterPixel();
806:    *(pTarRowTmp++) = HFiltPix.Red;
807:    *(pTarRowTmp++) = HFiltPix.Grn;
808:    *(pTarRowTmp++) = HFiltPix.Blu;
809:    //
810:    // Check to make sure that the Target Line stays within range
811:    //
812:    assert( (UINT) (pTarRowTmp-pTarRow-1) < HTarImage.Width()*3 );
813:    //
814:    // Write the Output Pixel line to disk
815:    //
816:    TRY
817:    {
818:        HTarImage.PutLine( pTarRow, iRow );
819:    }
820:    CATCH( CException, theException )
821:    {
822:        TRACE( "Error while writing a warped output image line.\n" );
823:        fcloseall();
824:        exit(1);
825:    }
826:    END_CATCH
827: //
828: // END LOOP -- horizontal lines
829: //
830: }
831: //
832: // Save warped Targa file
833: //
834: TRY
835: {
836:    HTarImage.Save( sCmd_Line.pchWarp );
837: }
838: CATCH( CException, theException )
839: {
840:    TRACE( "Error while saving the final Warp Image\n" );
841:    fcloseall();
842:    exit(1);
843: }
844: END_CATCH
845: //
846: // Free all allocated memory
847: //
848: free( pVTarIncLine );
849: free( pHTarIncLine );
850: SrcImage.FreeMemory();
851: TarImage.FreeMemory();
852: HSrcImage.FreeMemory();
853: HTarImage.FreeMemory();
854: fcloseall();
855: //
856: // Print status message
857: //
858: fprintf( stderr, "Program completed successfully!\n" );
```

WARP.CPP

```
859://
860:// END -- Warping FAST!
861://
862:}
863:
```

IMAGE.CPP

```
1://
2:// Image Class -- Encapsulates the Leadtools Image Functions
3://
4:// This image class greatly improves the LeadTools user interface by
5:// providing a simplified and consistent set of C++ member functions
6:// for manipulating images.
7://
8:// Program Name: IMAGE.CPP
9://
10:// Author: James D. E. Goel
11://
12://    - Initial release of the software. If you have any problems, please contact me.
13://
14:// Copyright (c)   1993 Genesis Microchip Inc.
15://                 200 Town Centre Blvd., Suite 400
16://                 Markham, Ontario
17://                 L3R 8G5
18://                 (905) 470-2742
19://
20:// All rights reserved.
21://
22:// Modifications:
23://
24:// Aug. 5, 1994    - James Goel
25://                 - Initial release
26://
27:#include "image.h"
28:#include <stdlib.h>
29:#include <assert.h>
30:#include <afx.h>
31:
32://
33:// Error codes
34://
35:#define NAME_SIZE   1
36:#define SAVE_ERR    2
37:#define READ_ERR    3
38:#define MEM_ERR     4
39:
40://
41://******************************************************************************
42:// error -- Prints appropriate error message and aborts gracefully.
43://******************************************************************************
44://
45:void Image::Error( int errnum )
46:{
47:  //
48:  // SWITCH ON: Associated error
49:  //
50:  switch(errnum)
51:  {
52:     //
53:     // ON CASE: Command line parameter error
54:     //
55:       case NAME_SIZE:
56:        //
57:        // Print out a file name size error message
58:        //
59:        fprintf ( stderr, "ERROR: One of the input file names exceeds the legal 8.3 file name size.\n");
60:        fprintf ( stderr, "Please reduce the size of the file name and try again.\n" );
61:     //
62:     // END CASE: command line
63:     //
64:     break;
65:     //
66:     // ON CASE: Leadtools could not save the output image
67:     //
68:     case SAVE_ERR:
69:        //
70:        // Print out save error message
71:        //
72:        fprintf( stderr, "ERROR: Could not save the output image file.\n");
73:        fprintf( stderr, "The disk may be full or corrupted. ");
74:        fprintf( stderr, "Please correct these conditions and try again.\n");
75:     //
76:     // END CASE: save error
77:     //
78:     break;
```

IMAGE.CPP

```
 79:    //
 80:    // ON CASE: Could not read the input image
 81:    //
 82:    case READ_ERR:
 83:       //
 84:       // Print out load error message
 85:       // Stop execution
 86:       //
 87:       fprintf( stderr, "ERROR: Could not read one of the the input files.\n");
 88:       fprintf( stderr, "The disk may be corrupted.");
 89:       fprintf( stderr, "Please correct these conditions and try again.\n");
 90:    //
 91:    // END CASE: load error
 92:    //
 93:    break;
 94:    //
 95:    // ON CASE: Could not allocate the required memory
 96:    //
 97:    case MEM_ERR:
 98:       //
 99:       // Print out error
100:       //
101:       fprintf( stderr, "ERROR: Could not allocate the required memory.\n");
102:       fprintf( stderr, "Please free up some DOS memory and try again.\n");
103:    //
104:    // END CASE: memory error
105:    //
106:    break;
107:    //
108:    // ON DEFAULT: A fatal internal error has been generated
109:    //
110:    default:
111:       //
112:       // Print out fatal internal error
113:       // Stop execution
114:       //
115:       printf("ERROR: A fatal internal error has occurred. Please call James Goel.\n");
116:    //
117:    // END DEFAULT: fatal error
118:    //
119:    break;
120: //
121: // END SWITCH: associated error
122: //
123: }
124://
125:// END ERROR
126://
127:}
128:
129://
130:// Default Constructor
131://
132:Image::Image(void)
133:{
134: FlagAllocLine = FALSE;
135: FlagAllocCol = FALSE;
136://
137:// END Default Constructor
138://
139:}
140:
141://
142:// Default Destructor
143://
144:Image::~Image(void)
145:{
146: TRACE( "Freeing Bitmap...\n" );
147: L_FreeBitmap( &ImageBitmap );
148: delete pLine;
149://
150:// END Default Destructor
151://
152:}
153:
154://
155:// Free Bitmaps
156://
```

IMAGE.CPP

```
157: void Image::FreeMemory(void)
158: {
159:    TRACE( "Freeing Bitmap and memory...\n" );
160:    L_FreeBitmap( &ImageBitmap );
161:    delete pLine;
162:    delete pCol;
163: }
164:
165: // ************************
166: // Construct an empty image
167: // ************************
168: void Image::Create( UINT iImgWidth, UINT iImgHeight )
169: {
170:    CFileException *theException = new CFileException;
171:    //
172:    // Initialize the bitmap to new width and height
173:    // IF the bitmap was NOT initialized successfully, THEN:
174:    //
175:    L_InitBitmap( &ImageBitmap, iImgWidth, iImgHeight, 24 );
176:    //
177:    // Allocate memory
178:    // IF the memory cannot be allocated, THEN:
179:    //
180:    if( L_AllocateBitmap( &ImageBitmap, TYPE_CONV ) != SUCCESS )
181:    {
182:        //
183:        // Print error message and abort
184:        //
185:        Error( MEM_ERR );
186:        L_FreeBitmap( &ImageBitmap );
187:        delete pLine;
188:        THROW( theException );
189:    //
190:    // END IF -- Allocate the bitmap memory
191:    //
192:    }
193:    iWidth = iImgWidth;
194:    iHeight = iImgHeight;
195:    //
196:    // Initialize some basic Bitmap properties
197:    //
198:    ImageBitmap.ViewPerspective = BOTTOM_LEFT;
199:    ImageBitmap.Order = ORDER_BGR;
200: //
201: // END -- Construct and empty image
202: //
203: }
204: // ************************
205: // Load in an Image File
206: // ************************
207: void Image::Load( char *pchInput )
208: {
209:    CFileException *theException = new CFileException;
210:    //
211:    // Load Targa Image
212:    // IF the image could not be loaded, THEN:
213:    //
214:    if( L_LoadTGAScreen( pchInput, &ImageBitmap, OUTPUT_BITMAP, TYPE_CONV, 0, 0 ) != SUCCESS )
215:    {
216:        //
217:        // Print error message and abort
218:        //
219:        Error( READ_ERR );
220:        THROW( theException );
221:    //
222:    // END IF -- load Targa image
223:    //
224:    }
225:    //
226:    // Copy the width and height information to the local private variables
227:    //
228:        iWidth = ImageBitmap.Width;
229:        iHeight = ImageBitmap.Height;
230: // END -- Load image file
231: //
232: }
233: // ******************
234: // Save an Image File
```

IMAGE.CPP

```
235:// *******************
236:void Image::Save( char *pchOutput )
237:{
238: CFileException *theException = new CFileException;
239: //
240: // Save Targa Image
241: // IF the image could not be saved, THEN:
242: //
243: if( L_SaveTGABitmap( pchOutput, &ImageBitmap, 24 )!= SUCCESS )
244: {
245:     //
246:     // Print error message and abort
247:     //
248:     Error( SAVE_ERR );
249:     L_FreeBitmap( &ImageBitmap );
250:     delete pLine;
251:     THROW( theException );
252: //
253: // END IF -- Save Targa image
254: //
255: }
256://
257:// END -- Save image file
258://
259:}
260:// **********************
261:// Return the Image Width
262:// **********************
263:UINT Image::Width( void )
264:{
265: return( iWidth);
266://
267:// END -- return image width
268://
269:}
270:// **********************
271:// Return the Image Height
272:// **********************
273:UINT Image::Height( void )
274:{
275: return( iHeight);
276://
277:// END -- return image Height
278://
279:}
280:// **************************
281:// Get a line from the Image
282:// **************************
283:BYTE *Image::GetLine( UINT iLineNum )
284:{
285: CFileException *theException = new CFileException;
286: assert( iLineNum < (UINT) ImageBitmap.Height );
287: //
288: // IF a line has not been allocated, THEN:
289: //
290: if( FlagAllocLine == FALSE )
291: {
292:     //
293:     // Allocate the Line
294:     //
295:     pLine = new BYTE[ImageBitmap.BytesPerLine];
296:     FlagAllocLine = TRUE;
297: //
298: // END IF -- a line has been allocated
299: //
300: }
301: //
302: // IF the origin is in the bottom left corner, THEN:
303: //
304: if( ImageBitmap.ViewPerspective == BOTTOM_LEFT )
305: {
306:     // Adjust the row number based on the origin of the image
307:     iLineNum = ImageBitmap.Height - iLineNum - 1;
308: //
309: // END IF -- origin in bottom-left corner
310: //
311: }
312: //
```

IMAGE.CPP

```
313: // Load the allocated line with data from the image
314: // IF the line could not be loaded, THEN:
315: //
316: if( L_GetBitmapRow( &ImageBitmap, pLine, iLineNum, ImageBitmap.BytesPerLine)<0)
317: {
318:    //
319:    // Print Error and abort
320:    //
321:    Error (MEM_ERR);
322:    L_FreeBitmap( &ImageBitmap );
323:    delete pLine;
324:    THROW( theException );
325: //
326: // END IF -- line could not be loaded
327: //
328: }
329: return( pLine );
330://
331:// END -- get a line from the Image
332://
333:}
334:// ****************************
335:// Put a line in the Image
336:// ****************************
337:void Image::PutLine( BYTE *pImgLine, UINT iLineNum )
338:{
339: CFileException *theException = new CFileException;
340: assert( iLineNum < (UINT) ImageBitmap.Height );
341: //
342: // IF the origin is in the bottom left corner, THEN:
343: //
344: if( ImageBitmap.ViewPerspective == BOTTOM_LEFT )
345: {
346:    // Adjust the row number based on the origin of the image
347:    iLineNum = ImageBitmap.Height - iLineNum - 1;
348: //
349: // END IF -- origin in bottom-left corner
350: //
351: }
352: //
353: // Put the line into the image
354: // IF the line could not be placed, THEN:
355: //
356: if( L_PutBitmapRow( &ImageBitmap, pImgLine, iLineNum, ImageBitmap.BytesPerLine)<0)
357: {
358:    //
359:    // Print Error and abort
360:    //
361:    Error (MEM_ERR);
362:    L_FreeBitmap( &ImageBitmap );
363:    delete pLine;
364:    THROW( theException );
365: //
366: // END IF -- line could not be placed
367: //
368: }
369://
370:// END -- put a line in the Image
371://
372:}
373:// ****************************
374:// Get a column from the Image
375:// ****************************
376:BYTE *Image::GetColumn( UINT iColNum )
377:{
378: UINT   iRowNum;
379: UINT   iRow;
380: BYTE   pColPixel[3];
381: BYTE   *pColTmp;
382: assert( iColNum < (UINT) ImageBitmap.Width );
383: //
384: // IF a column has not been allocated, THEN:
385: //
386: if( FlagAllocCol == FALSE )
387: {
388:    //
389:    // Allocate the Column
390:    //
```

IMAGE.CPP

```
391:    printf( "Allocating a column space..\n");
392:    pCol = new BYTE[ImageBitmap.Height*3];
393:    FlagAllocCol = TRUE;
394: //
395: // END IF -- a column has been allocated
396: //
397: }
398: pColTmp = pCol;
399: //
400: // LOOP through the number of pixels in a specific column
401: //
402: for( iRowNum=0; iRowNum < (UINT) ImageBitmap.Height; iRowNum++ )
403: {
404:    iRow = iRowNum;
405:    //
406:    // IF the origin is in the bottom left corner, THEN:
407:    //
408:    if( ImageBitmap.ViewPerspective == BOTTOM_LEFT )
409:    {
410:       // Adjust the row number based on the origin of the image
411:       iRow = ImageBitmap.Height - 1 - iRowNum ;
412:    //
413:    // END IF -- origin in bottom-left corner
414:    //
415:    }
416:    //
417:    // Read RGB pixel from the specific column
418:    //
419:    L_GetBitmapRowCol( &ImageBitmap, pColPixel, iRow, iColNum, 3 );
420:    //
421:    // Copy the RGB pixel to the output buffer
422:    assert( pColTmp-pCol < ImageBitmap.Height*3 );
423:    *(pColTmp++) = *pColPixel;
424:    *(pColTmp++) = *(pColPixel+1);
425:    *(pColTmp++) = *(pColPixel+2);
426: //
427: // END LOOP -- number of pixels in a specific column
428: //
429: }
430: return( pCol );
431: //
432: // END -- get a column from the Image
433: //
434: }
435: //
436: // ****************************
437: // Put a column in the Image
438: // ****************************
439: //
440: void Image::PutColumn( BYTE* pCol, UINT iColNum )
441: {
442: UINT   iRowNum;
443: UINT   iRow;
444: BYTE   *pColTmp;
445: BYTE   *pLineTmp;
446: assert( iColNum < (UINT) ImageBitmap.Width );
447: assert( pCol != NULL );
448: //
449: // Create a temporary line holder
450: //
451: pLineTmp = new BYTE[ImageBitmap.BytesPerLine];
452: //
453: // Copy the original column pointer
454: //
455: pColTmp = pCol;
456: //
457: // LOOP through the number of pixels in a specific column
458: //
459: for( iRowNum=0; iRowNum < (UINT) ImageBitmap.Height; iRowNum++ )
460: {
461:    iRow = iRowNum;
462:    //
463:    // IF the origin is in the bottom left corner, THEN:
464:    //
465:    if( ImageBitmap.ViewPerspective == BOTTOM_LEFT )
466:    {
467:       // Adjust the row number based on the origin of the image
468:       iRow = ImageBitmap.Height - 1 - iRowNum ;
```

IMAGE.CPP 

```
469:    //
470:    // END IF -- origin in bottom-left corner
471:    //
472:    }
473:    //
474:    // Copy the RGB pixel to the output buffer
475:    //
476:    assert( pColTmp-pCol < ImageBitmap.Height*3 );
477:    //
478:    // Write the RGB pixel to the specific column
479:    //
480:    L_GetBitmapRow( &ImageBitmap, pLineTmp, iRow, ImageBitmap.BytesPerLine );
481:    pLineTmp[0+iColNum*3] = *pColTmp++;
482:    pLineTmp[1+iColNum*3] = *pColTmp++;
483:    pLineTmp[2+iColNum*3] = *pColTmp++;
484:    L_PutBitmapRow( &ImageBitmap, pLineTmp, iRow, ImageBitmap.BytesPerLine );
485:    //
486:    // NOTE : I suspect a bug in this Leadtools routine
487:    //
488:    //L_PutBitmapRowCol( &ImageBitmap, ColPixel, iRow, iColNum, 3 );
489: //
490: // END LOOP -- number of pixels in a specific column
491: //
492: }
493: delete pLineTmp;
494://
495:// END -- put a column in the Image
496://
497:}
```

Aug 23 94
16:58:34
LOGIC.CPP

```
1://
2:// Genesis Logic Classes 1.0
3://
4:// This set of classes implements some basic logic functions
5:// for use in the Genesis Warping Engine software.
6://
7:// Program Name: LOGIC.CPP
8://
9:// Author: James D. E. Goel
10://
11://   - Initial release of the software. If you have any problems, please contact me.
12://
13:// Copyright (c)   1993 Genesis Microchip Inc.
14://                 200 Town Centre Blvd., Suite 400
15://                 Markham, Ontario
16://                 L3R 8G5
17://                 (905) 470-2742
18://
19://  All rights reserved.
20://
21:// Modifications:
22://
23://  Aug. 8, 1994   - James Goel
24://                 - Initial release
25://
26:
27:#include "logic.h"
28:#include <assert.h>
29:#include <stdio.h>
30:#include <afx.h>
31://
32:// Create some useful type definitions
33://
34:typedef unsigned char BYTE;
35:typedef unsigned char PIXEL;
36:typedef unsigned long ULONG;
37:typedef unsigned int UINT;
38:
39://*********************************************************
40:// D-Flop Register Class
41://*********************************************************
42://
43:// This class simulates a logical DFLOP.
44://
45://*********************************************
46:// D-Flop Clock transfers inputs to outputs
47://*********************************************
48:void REG::Clk( void )
49:{
50:  Out = In;
51://
52:// END -- Constructor
53:}
54:
55://*********************************************************
56:// Filter Lookup Table
57://*********************************************************
58://
59:// This class simulates the Filter Lookup table in the warping
60:// patent. (reproduced below for completeness)
61://
62:// TarInc    0<t<=1   1<t<=2   2<t<=4   4<t<=8   8<t<=16   16<t<=32
63:// FiltSize   3 Tap    5 Tap    9 Tap   17 Tap   33 Tap    65 Tap
64:// FiltFactor   0        1        2        3       4         5
65://
66:// 1. TarInc is the space between output Target pixels.
67:// 2. FiltSize is the FIR filter tap size
68:// 3. FiltFactor is the number of right shifts required to divide the TarInc
69://    into an appropriate Up Sample Increment.
70://
71:// Constructor and Destructor
72://
73:LOOKUP::LOOKUP( void )
74:{
75:};
76:LOOKUP::~LOOKUP( void )
77:{
78:};
```

LOGIC.CPP

```cpp
79://  ----------------------------------------------------------------
80:// Out -- Outputs a filter factor based on the fTarInc value
81://  ----------------------------------------------------------------
82:UINT LOOKUP::Out( void )
83:{
84:  assert( fTarInc > 0 );
85:  //
86:  // IF TarInc is in the first category, THEN:
87:  //
88:  if( (fTarInc > 0) && (fTarInc <= 1))
89:     //
90:     // Return a Filter Factor of 0 for the 3 Tap FIR filter
91:     //
92:     return 0;
93:  //
94:  // ELSE IF TarInc is in the second category, THEN:
95:  //
96:  else if ( (fTarInc > 1) && (fTarInc <= 2))
97:     //
98:     // Return a Filter Factor of 1 for the 5 Tap FIR filter
99:     //
100:    return 1;
101: //
102: // ELSE IF TarInc is in the third category, THEN:
103: //
104: else if ( (fTarInc > 2) && (fTarInc <= 4))
105:    //
106:    // Return a Filter Factor of 2 for the 9 Tap FIR filter
107:    //
108:    return 2;
109: //
110: // ELSE IF TarInc is in the fourth category, THEN:
111: //
112: else if ( (fTarInc > 4) && (fTarInc <= 8))
113:    //
114:    // Return a Filter Factor of 3 for the 17 Tap FIR filter
115:    //
116:    return 3;
117: //
118: // ELSE IF TarInc is in the fifth category, THEN:
119: //
120: else if ( (fTarInc > 8) && (fTarInc <= 16))
121:    //
122:    // Return a Filter Factor of 4 for the 33 Tap FIR filter
123:    //
124:    return 4;
125: //
126: // ELSE IF TarInc is in the sixth category, THEN:
127: //
128: else if ( (fTarInc > 16) && (fTarInc <= 32))
129:    //
130:    // Return a Filter Factor of 5 for the 65 Tap FIR filter
131:    //
132:    return 5;
133: //
134: // ELSE TarInc does not fit into any category, THEN:
135: //
136: else
137: {
138:    //
139:    // Print internal error message
140:    //
141:    fprintf( stderr, "Fatal internal error.\n");
142:    printf( "fTarInc..[%f]\n", fTarInc );
143:    return 5;
144: //
145: // END IF -- Filter Lookup Table
146: //
147: };
148://
149:// END FUNCTION-- LOOKUP::Out
150://
151:};
152:
153:// ***********************
154:// Three Input Comparator
155:// ***********************
156://
```

LOGIC.CPP 

```
157:// Compares three inputs and outputs the largest one.
158://
159:UINT TRICOMP::Out( void )
160:{
161: UINT  iTemp;
162: //
163: // Output the largest of three values
164: //
165: if( A > B)
166:     iTemp = A;
167: else
168:     iTemp = B;
169:
170: if( iTemp > C)
171:     return iTemp;
172: else
173:     return C;
174://
175:// END FUNCTION -- TRICOMP
176://
177:};
178:
179:// ***********************
180:// Two Input Comparator
181:// ***********************
182://
183:// Compares two inputs and outputs the largest one.
184://
185:UINT BICOMP::Out( void )
186:{
187: //
188: // Output the largest of two values
189: //
190: if( A > B )
191:     return A;
192: else
193:     return B;
194://
195:// END FUNCTION -- BICOMP
196://
197:};
198:
199:// ******************************
200:// Upsample Increment Generator
201:// ******************************
202://
203:// Right shifts TarInc by the Filter Factor supplied by the
204:// Filter Lookup table.
205://
206:ULONG IncGen::Out( void )
207:{
208: ULONG lUpInc;
209: //
210: // Convert fTarInc to an integer value for
211: // faster and easier arthimetic calculations
212: //
213: lUpInc = (ULONG) ( fTarInc * INDEX_PRECISION_VALUE);
214: return ( lUpInc >> FiltFact );
215://
216:// END FUNCTION -- Out
217://
218:};
219:
220:// *************
221:// Interpolator
222:// *************
223://
224:// Generates Interpolated pixels based on the size of the Filter Factor
225:// Generates a flag that indicates it has come to the end of a TarInc
226:// value.
227:// ---------------------------------
228:// Default Constructor and Destructor
229:// ---------------------------------
230:Interpolate::Interpolate( void )
231:{
232: //
233: // Initialize private variables
234: //
```

LOGIC.CPP

```
235: Accum = 0L;
236: UpIncCount = 0;
237: NextPixPos = 0L;
238: CurrPixPos = 0L;
239: //
240: // END -- Interpolate::Constructor
241: //
242: };
243: Interpolate::~Interpolate( void )
244: {
245: };
246: // ----------------------------------------------
247: // Reset -- Reset and initialize the interpolator
248: // ----------------------------------------------
249: void Interpolate::Reset(void)
250: {
251:    //
252:    // Initialize private variables
253:    //
254:    Accum = 0L;
255:    UpIncCount = 0;
256:    NextPixPos = 0L;
257:    CurrPixPos = 0L;
258:    iTarIncWidth = 0;
259:    //
260:    // Advance the current pixel value to be the next pixel value
261:    //
262:    SrcCurrPix.Red = *pSrcLine++;
263:    SrcCurrPix.Grn = *pSrcLine++;
264:    SrcCurrPix.Blu = *pSrcLine++;
265:    //
266:    // Load SrcNextPix = GetNewSrc(pix)
267:    //
268:    SrcNextPix.Red = *pSrcLine++;
269:    SrcNextPix.Grn = *pSrcLine++;
270:    SrcNextPix.Blu = *pSrcLine++;
271:    //
272:    // Initialize the Upsampled Pixel
273:    //
274:    UpPix.Red=SrcCurrPix.Red;
275:    UpPix.Grn=SrcCurrPix.Grn;
276:    UpPix.Blu=SrcCurrPix.Blu;
277: //
278: // END -- Interpolate::Reset
279: //
280: };
281: // ----------------------------------------------
282: // SetSrcLine -- Function to set the Source Line
283: // ----------------------------------------------
284: void Interpolate::SetSrc( BYTE *pLine )
285: {
286:    //
287:    // Load the source line into a private pointer
288:    //
289:    pSrcLine = pLine;
290:    pSrcLineTmp = pLine;
291: //
292: // END -- Interpolate::SetSrcLine
293: //
294: };
295: // --------------------------------------------------------------------------
296: // CenterTap -- Indicates when an interpolated pixel is the center tap for an
297: //              FIR filter
298: // --------------------------------------------------------------------------
299: BOOLEAN Interpolate::CenterTap( void )
300: {
301:    //
302:    // IF the interpolator is creating the first upsampled pixel OR
303:    // IF the interpolator is creating the last upsampled pixel THEN
304:    //
305:    if( UpIncCount*2 == (UINT) ( 2 << FiltFact) )
306:    {
307:       //
308:       // Initialize the UpSample increment counter and return a TRUE
309:       //
310:       UpIncCount = 0;
311:       return TRUE;
312:    }
```

LOGIC.CPP

```cpp
313: else
314: {
315:     //
316:     // Advance the UpIncCount
317:     //
318:     UpIncCount++;
319:     return FALSE;
320: }
321: //
322: // END IF -- interpolator
323: //
324: //
325: // END -- Interpolator::CenterTap
326: //
327: };
328:
329: // ------------------------------------
330: // Out -- Generates and up-sample pixel
331: // ------------------------------------
332: Pixel Interpolate::Generate( void )
333: {
334: ULONG Test;
335: //
336: // Accumulate the Up Sampled Increment
337: //
338: Accum += UpInc;
339: //
340: // The next pixel position is derived from the integer portion of accumulated UpInc
341: //
342: NextPixPos = GetInt( Accum );
343: //
344: // IF Next pixel position requires a new source pixel, AND
345: // IF the next pixel has not gone past the end of the TarInc line, THEN:
346: //
347: if( (NextPixPos > CurrPixPos) && (NextPixPos < iTarIncWidth) )
348: {
349:     //
350:     // Advance the current pixel position
351:     //
352:     CurrPixPos = NextPixPos;
353:     //
354:     // Advance the current pixel value to be the next pixel value
355:     //
356:     SrcCurrPix.Red = SrcNextPix.Red;
357:     SrcCurrPix.Grn = SrcNextPix.Grn;
358:     SrcCurrPix.Blu = SrcNextPix.Blu;
359:     //
360:     // Load SrcNextPix = GetNewSrc(pix)
361:     //
362:     SrcNextPix.Red = *pSrcLine++;
363:     SrcNextPix.Grn = *pSrcLine++;
364:     SrcNextPix.Blu = *pSrcLine++;
365: //
366: // END IF -- NextPixPos > CurrPixPos
367: //
368: };
369: //
370: // Calculate Interpolated pixel using linear interpolation.
371: // UpPix = SrcCurrPix + Fractional(Accum) * (SrcNextPix - SrcCurrPix )
372: //
373: Test = GetFrac(Accum);
374: UpPix.Red = (BYTE) SrcCurrPix.Red + (BYTE)
375:             (GetFrac(Accum)*(SrcNextPix.Red - SrcCurrPix.Red)>>INDEX_PRECISION);
376: UpPix.Grn = (BYTE) SrcCurrPix.Grn + (BYTE)
377:             (GetFrac(Accum)*(SrcNextPix.Grn - SrcCurrPix.Grn)>>INDEX_PRECISION);
378: UpPix.Blu = (BYTE) SrcCurrPix.Blu + (BYTE)
379:             (GetFrac(Accum)*(SrcNextPix.Blu - SrcCurrPix.Blu)>>INDEX_PRECISION);
380: return UpPix;
381: //
382: // END FUNCTION -- Interpolator::Out
383: //
384: };
385: // ************************
386: // Left FIR Filter Kernel
387: // ************************
388: //
389: // This class creates the left half of an Output Pixel based
390: // on the FIR filter indicated by the Filter Factor.
```

LOGIC.CPP

```
391://
392:// Default Constructor and Destructor
393://
394:LeftKernel::LeftKernel( void )
395:{
396:};
397:LeftKernel::-LeftKernel( void )
398:{
399:};
400://  ----------------------------------------
401:// Reset -- Initializes the Left Kernel MAC
402://  ----------------------------------------
403:void LeftKernel::Reset( void )
404:{
405:  //
406:  // Initialize private variables
407:  //
408:  Double=FALSE;
409:  KernelPos=0;
410:  AccumRed=0;
411:  AccumGrn=0;
412:  AccumBlu=0;
413://
414:// END -- LeftKernel::Reset
415://
416:};
417://  ----------------------
418:// MAC -- Filter a pixel
419://  ----------------------
420:void LeftKernel::MAC( Pixel UpPix )
421:{
422:  UINT iEdgeFactor = 1;
423:  //
424:  // IF the kernel is doubled, THEN:
425:  //
426:  if( Double==TRUE )
427:      //
428:      // Double the UpSampled Pixel
429:      //
430:      iEdgeFactor = 2;
431:  //
432:  // END IF -- double the kernel
433:  //
434:  // Accumulate the FIR Coefficient * UpSampled Pixel
435:  //
436:  AccumRed += iLeftCoeff[FiltFact][KernelPos] * UpPix.Red * iEdgeFactor;
437:  AccumGrn += iLeftCoeff[FiltFact][KernelPos] * UpPix.Grn * iEdgeFactor;
438:  AccumBlu += iLeftCoeff[FiltFact][KernelPos] * UpPix.Blu * iEdgeFactor;
439:  //
440:  // Advance to the next kernel position
441:  //
442:  KernelPos++;
443:  //
444:  // IF the kernel has rolled over, THEN:
445:  //
446:  if( KernelPos > (UINT) (1 << FiltFact))
447:      //
448:      // Initialize the Kernel
449:      //
450:      KernelPos=0;
451:  //
452:  // END IF -- kernel has rolled over
453:  //
454://
455:// END -- LeftKernel::MAC
456://
457:};
458://  ------------------------------------
459:// FilterPixel -- Return a Filter Pixel
460://  ------------------------------------
461:Pixel LeftKernel::FilterPixel( void )
462:{
463:  FiltPix.Red = (BYTE) (AccumRed >> UBYTE_MAX);
464:  FiltPix.Blu = (BYTE) (AccumBlu >> UBYTE_MAX);
465:  FiltPix.Grn = (BYTE) (AccumGrn >> UBYTE_MAX);
466:  //
467:  // Clamp the Filtered pixel if required
468:  //
```

LOGIC.CPP

```
469: if( AccumRed < 0 )
470:     FiltPix.Red = (BYTE) 0;
471: if( AccumGrn < 0 )
472:     FiltPix.Grn = (BYTE) 0;
473: if( AccumBlu < 0 )
474:     FiltPix.Blu = (BYTE) 0;
475:
476: if( AccumRed > 65280 )
477:     FiltPix.Red = (BYTE) 255;
478: if( AccumGrn > 65280 )
479:     FiltPix.Grn = (BYTE) 255;
480: if( AccumBlu > 65280 )
481:     FiltPix.Blu = (BYTE) 255;
482:
483: return( FiltPix );
484://
485:// END -- LeftKernel::FilterPixel
486://
487:};
488:// **********************
489:// Right FIR Filter Kernel
490:// **********************
491://
492:// This class creates the Right half of an Output Pixel based
493:// on the FIR filter indicated by the Filter Factor.
494://
495:// Default Constructor and Destructor
496://
497:RightKernel::RightKernel( void )
498:{
499:};
500:RightKernel::~RightKernel( void )
501:{
502:};
503:// ----------------------------------------
504:// Reset -- Initialize the Right Kernel MAC
505:// ----------------------------------------
506:void RightKernel::Reset( void )
507:{
508: //
509: // Initialize private variables
510: //
511: Double = FALSE;
512: KernelPos=0;
513: AccumRed=0;
514: AccumGrn=0;
515: AccumBlu=0;
516://
517:// END -- RightKernel::Reset
518://
519:};
520:// ----------------------
521:// MAC -- Filter a pixel
522:// ----------------------
523:void RightKernel::MAC( Pixel UpPix )
524:{
525: UINT iEdgeFactor = 1;
526: //
527: // IF the kernel is doubled, THEN:
528: //
529: if( Double==TRUE )
530:     //
531:     // Double the UpSampled Pixel
532:     //
533:     iEdgeFactor = 2;
534: //
535: // END IF -- double the kernel
536: //
537: // Accumulate the FIR Coefficient * UpSampled Pixel
538: //
539: AccumRed += iRightCoeff[FiltFact][KernelPos] * UpPix.Red * iEdgeFactor;
540: AccumGrn += iRightCoeff[FiltFact][KernelPos] * UpPix.Grn * iEdgeFactor;
541: AccumBlu += iRightCoeff[FiltFact][KernelPos] * UpPix.Blu * iEdgeFactor;
542: KernelPos++;
543: //
544: // IF the kernel has rolled over, THEN:
545: //
546: if( KernelPos > (UINT) (1 << FiltFact))
```

LOGIC.CPP

```
547:    //
548:    // Initialize the Kernel
549:    //
550:    KernelPos=0;
551: //
552: // END IF -- kernel has rolled over
553: //
554://
555:// END -- RightKernel::MAC
556://
557:};
558://  ------------------------------------
559:// FilterPixel -- Return a Filter Pixel
560://  ------------------------------------
561:Pixel RightKernel::FilterPixel( void )
562:{
563:  //
564:  // Convert the accumulated filtered pixel to a byte
565:  //
566:  FiltPix.Red = (BYTE) (AccumRed >> UBYTE_MAX);
567:  FiltPix.Grn = (BYTE) (AccumGrn >> UBYTE_MAX);
568:  FiltPix.Blu = (BYTE) (AccumBlu >> UBYTE_MAX);
569:  //
570:  // Clamp the Filtered pixel if required
571:  //
572:  if( AccumRed < 0)
573:     FiltPix.Red = (BYTE) 0;
574:  if( AccumGrn < 0)
575:     FiltPix.Grn = (BYTE) 0;
576:  if( AccumBlu < 0)
577:     FiltPix.Blu = (BYTE) 0;
578:
579:  if( AccumRed > 65280 )
580:     FiltPix.Red = (BYTE) 255;
581:  if( AccumGrn > 65280 )
582:     FiltPix.Grn = (BYTE) 255;
583:  if( AccumBlu > 65280 )
584:     FiltPix.Blu = (BYTE) 255;
585: return( FiltPix );
586://
587:// END -- RightKernel::FilterPixel
588://
589:};
```

LOGIC.H

```
1://
2:// Genesis Logic Classes 1.0
3://
4:// This set of classes implements some basic logic functions
5:// for use in the Genesis Warping Engine software.
6://
7:// Program Name: LOGIC.CPP
8://
9:// Author: James D. E. Goel
10://
11://    - Initial release of the software. If you have any problems, please contact me.
12://
13:// Copyright (c)   1993 Genesis Microchip Inc.
14://                 200 Town Centre Blvd., Suite 400
15://                 Markham, Ontario
16://                 L3R 8G5
17://                 (905) 470-2742
18://
19:// All rights reserved.
20://
21:// Modifications:
22://
23://  Aug. 8, 1994   - James Goel
24://                 - Initial release
25://
26:
27:#ifndef __LOGICCLASS_H__
28:#define __LOGICCLASS_H__
29:#endif
30:
31:#ifndef __cplusplus
32:#error Microsoft Foundation Classes require C++ compilation (use a .cpp suffix)
33:#endif
34:
35:typedef unsigned char BYTE;
36:typedef unsigned char PIXEL;
37:typedef unsigned long ULONG;
38:typedef unsigned int UINT;
39:
40://
41:// Define a Pixel structure
42://
43:typedef struct pixel_tag
44:{
45:  BYTE  Red;
46:  BYTE  Grn;
47:  BYTE  Blu;
48:} Pixel;
49:
50://
51:// Setup a boolean type with TRUE=1 and FALSE=0
52://
53:typedef unsigned int BOOLEAN;
54:#define TRUE 1
55:#define FALSE 0
56:
57://
58:// Define the fractional precision of TarInc
59://
60:#define INDEX_PRECISION        16L      // 16 fractional bits of precision
61:#define INDEX_PRECISION_VALUE  (1L << INDEX_PRECISION)
62:#define INDEX_PRECISION_MASK   ((1L << INDEX_PRECISION) - 1L)
63:
64://
65:// Define the number of bits per byte
66://
67:#define UBYTE_MAX 8
68:
69:#define GetInt(Value)     ((ULONG)((Value) >> INDEX_PRECISION))
70:#define GetFrac(Value)    ((Value) & INDEX_PRECISION_MASK)
71:
72://
73:// gm865x1 FIR Filter Coefficients
74://
75:#define MAX_FILTER     6         // Maximum filter type number
76:#define MAX_TAPS       33        // Maximum number of filter taps (Kernal doubled)
77:
78://
```

LOGIC.H

```
79:// Left Kernel Coefficients
80://
81:const long iLeftCoeff[MAX_FILTER][MAX_TAPS] =
82:{
83: {-64, 192,  0,  0,  0,  0,  0,  0,  0,  0,  0,  0,  0,  0,  0,  0,  0,  0,  0,  0,  0,  0,  0,  0,  0,  0,  0,  0,  0,  0,  0,  0},
84: {-16,  64, 80,  0,  0,  0,  0,  0,  0,  0,  0,  0,  0,  0,  0,  0,  0,  0,  0,  0,  0,  0,  0,  0,  0,  0,  0,  0,  0,  0,  0,  0},
85: { -7,   3, 30, 63, 39,  0,  0,  0,  0,  0,  0,  0,  0,  0,  0,  0,  0,  0,  0,  0,  0,  0,  0,  0,  0,  0,  0,  0,  0,  0,  0,  0},
86: { -3,  -2,  1,  7, 15, 23, 31, 37, 19,  0,  0,  0,  0,  0,  0,  0,  0,  0,  0,  0,  0,  0,  0,  0,  0,  0,  0,  0,  0,  0,  0,  0},
87: { -1,  -1, -1,  0,  0,  2,  3,  5,  7,  9, 11, 13, 15, 16, 33, 24,  9,  0,  0,  0,  0,  0,  0,  0,  0,  0,  0,  0,  0,  0,  0,  0},
88: {  1,   1,  1,  2,  2,  3,  3,  4,  4,  5,  5,  6,  6,  7,  7,  8,  8,  8,  8,  9,  9, 16,  5,  0,  0,  0,  0,  0,  0,  0,  0,  0}
89:};
90://
91:// Right Kernel Coefficients
92://
93:const long iRightCoeff[MAX_FILTER][MAX_TAPS] =
94:{
95: {192,-64,  0,  0,  0,  0,  0,  0,  0,  0,  0,  0,  0,  0,  0,  0,  0,  0,  0,  0,  0,  0,  0,  0,  0,  0,  0,  0,  0,  0,  0,  0},
96: { 80, 64, -16, 0,  0,  0,  0,  0,  0,  0,  0,  0,  0,  0,  0,  0,  0,  0,  0,  0,  0,  0,  0,  0,  0,  0,  0,  0,  0,  0,  0,  0},
97: { 39, 63, 30,  3, -7,  0,  0,  0,  0,  0,  0,  0,  0,  0,  0,  0,  0,  0,  0,  0,  0,  0,  0,  0,  0,  0,  0,  0,  0,  0,  0,  0}
98: { 19, 37, 31, 23, 15,  7,  1, -2, -3,  0,  0,  0,  0,  0,  0,  0,  0,  0,  0,  0,  0,  0,  0,  0,  0,  0,  0,  0,  0,  0,  0,  0}
99: {  9, 24, 33, 16, 15, 13, 11,  9,  7,  5,  3,  2,  0,  0, -1, -1, -1,  0,  0,  0,  0,  0,  0,  0,  0,  0,  0,  0,  0,  0,  0,  0},
100:{  5, 16,  9,  9,  8,  8,  8,  8,  7,  7,  6,  6,  5,  5,  4,  4,  3,  3,  2,  2,  1,  1,  1,  0,  0,  0,  0,  0,  0,  0,  0,  0}
101:};
102:
103://****************************************************************
104:// D-Flop Register Class
105://****************************************************************
106://
107:// This class simulates a logical DFLOP.
108://
109:class REG
110:{
111:private:
112:public:
113: //
114: // Input and Output Register Value
115: //
116: UINT  In;
117: UINT  Out;
118: //
119: // Class Constructor and Destructor
120: //
121: REG( void );
122: ~REG( void );
123: //
124: // Clock register value
125: //
126: void Clk( void );
127://
128:// END CLASS -- REG
129://
130:};
131:
132://****************************************************************
133:// Filter Lookup Table
134://****************************************************************
135://
136:// This class simulates the Filter Lookup table in the warping
137:// patent. (reproduced below for completeness)
138://
139:// TarInc     0<t<=1   1<t<=2   2<t<=4   4<t<=8   8<t<=16  16<t<=32
140:// FiltSize    3 Tap    5 Tap    9 Tap   17 Tap   33 Tap   65 Tap
141:// FiltFactor    0        1        2        3        4        5
142://
143:// 1. TarInc is the space between output Target pixels.
144:// 2. FiltSize is the FIR filter tap size
145:// 3. FiltFactor is the number of right shifts required to divide the TarInc
146://    into an appropriate Up Sample Increment.
147://
```

LOGIC.H

```
148:class LOOKUP
149:{
150:private:
151:public:
152: //
153: // Constructor and Destructor
154: //
155: LOOKUP(void);
156: ~LOOKUP(void);
157: //
158: // Output Target pixel spacing
159: //
160: float fTarInc;
161: //
162: // Mapped Filter Factor for the input TarInc
163: //
164: UINT Out(void);
165:};
166:
167://***********************
168:// Three Input Comparator
169://***********************
170://
171:// Compares three inputs and outputs the largest one.
172://
173:class TRICOMP
174:{
175:private:
176:public:
177: //
178: // Constructor and Destructor
179: //
180: TRICOMP(void);
181: ~TRICOMP(void);
182: //
183: // Three input variables
184: //
185: UINT A,B,C;
186: //
187: // Generate the output
188: //
189: UINT Out(void);
190:};
191:
192://***********************
193:// Two Input Comparator
194://***********************
195://
196:// Compares two inputs and outputs the largest one.
197://
198:class BICOMP
199:{
200:private:
201:public:
202: //
203: // Constructor and Destructor
204: //
205: BICOMP(void);
206: ~BICOMP(void);
207: //
208: // Two input variables
209: //
210: UINT A,B;
211: //
212: // Generate the output
213: //
214: UINT Out(void);
215:};
216:
217://******************************
218:// Upsample Increment Generator
219://******************************
220://
221:// Right shifts TarInc by the Filter Factor supplied by the
222:// Filter Lookup table.
223://
224:class IncGen
225:{
```

 

LOGIC.H

```
226:private:
227:public:
228: //
229: // Upsample Filter Factor
230: //
231: UINT  FiltFact;
232: float fTarInc;
233: //
234: // Output an Upsample Increment
235: //
236: ULONG Out( void );
237:};
238://  *************
239:// Interpolator
240://  *************
241://
242:// Generates Interpolated pixels based on the size of the Filter Factor
243:// Generates a flag that indicates it has come to the end of a TarInc
244:// value.
245://
246:class Interpolate
247:{
248:private:
249: UINT  UpIncCount;
250: ULONG CurrPixPos, NextPixPos;
251: Pixel SrcCurrPix,SrcNextPix;
252: BYTE  *pSrcLine, *pSrcLineTmp;
253:public:
254: //
255: // Upsample Filter Factor
256: //
257: ULONG Accum;
258: UINT  FiltFact;
259: float fTarInc;
260: Pixel UpPix;
261: BYTE  bPixel;
262: ULONG UpInc;
263: UINT  iTarIncWidth;
264: //
265: // Constructor and Destructor
266: //
267: Interpolate( void );
268: ~Interpolate( void );
269: //
270: // Resets the interpolator to a known state
271: //
272: void Reset( void );
273: //
274: // Function to set the pointer to the Source Line
275: //
276: void SetSrc( BYTE *pLine );
277: //
278: // Generate an Interpolated Pixel
279: //
280: Pixel Generate( void );
281: //
282: // Flag indicates when the center kernel
283: // tap interpolated pixel is being generated
284: //
285: BOOLEAN CenterTap( void );
286:};
287://  **************************
288:// Left FIR Filter Kernel MAC
289://  **************************
290://
291:// This class creates the left half of an Output Pixel based
292:// on the FIR filter indicated by the Filter Factor.
293://
294:class LeftKernel
295:{
296:private:
297: UINT  KernelPos;
298:public:
299: long  AccumRed;
300: long  AccumGrn;
301: long  AccumBlu;
302: BOOLEAN Double;
303: Pixel FiltPix;
```

LOGIC.H

```
304: UINT  FiltFact;
305: //
306: // Constructor and Destructor
307: //
308: LeftKernel( void );
309: ~LeftKernel( void);
310: //
311: // Reset MAC to a known state
312: //
313: void Reset( void );
314: //
315: // Generate a filtered pixel
316: //
317: void MAC( Pixel UpPix );
318: //
319: // Return a Filtered Pixel
320: //
321: Pixel FilterPixel( void );
322://
323:// END CLASS -- LeftKernelMAC
324://
325:};
326:// ****************************
327:// Right FIR Filter Kernel MAC
328:// ****************************
329://
330:// This class creates the right half of an Output Pixel based
331:// on the FIR filter indicated by the Filter Factor.
332://
333:class RightKernel
334:{
335:private:
336: UINT  KernelPos;
337:public:
338: long   AccumRed;
339: long   AccumGrn;
340: long   AccumBlu;
341: BOOLEAN  Double;
342: Pixel  FiltPix;
343: UINT  FiltFact;
344: //
345: // Constructor and Destructor
346: //
347: RightKernel( void );
348: ~RightKernel( void);
349: //
350: // Reset MAC to a known state
351: //
352: void Reset( void );
353: //
354: // Generate a filtered pixel
355: //
356: void MAC( Pixel UpPix );
357: //
358: // Return a Filtered Pixel
359: //
360: Pixel FilterPixel( void );
361://
362:// END CLASS -- RightKernelMAC
363://
364:};
```

IMAGE.H

```
 1://
 2:// Image Class -- Encapsulates the Leadtools Image Functions
 3://
 4:// This image class greatly improves the LeadTools user interface by
 5:// providing a simplified and consistent set of C++ member functions
 6:// for manipulating images.
 7://
 8:// Program Name: IMAGE.CPP
 9://
10:// Author: James D. E. Goel
11://
12://   - Initial release of the software. If you have any problems, please contact me.
13://
14:// Copyright (c)   1993 Genesis Microchip Inc.
15://                 200 Town Centre Blvd., Suite 400
16://                 Markham, Ontario
17://                 L3R 8G5
18://                 (905) 470-2742
19://
20://  All rights reserved.
21://
22:// Modifications:
23://
24://  Aug. 5, 1994   - James Goel
25://                 - Initial release
26://
27:// Class definition
28://
29://
30:#define FOR_DOS
31:#include "l_toolp.h"
32:#include "l_bitmap.h"
33:#include "l_error.h"
34://
35:// Setup LEAD TOOLS for DOS definitions
36://
37:#ifndef __IMAGECLASS_H__
38:#define __IMAGECLASS_H__
39:#endif
40:
41:#ifndef __cplusplus
42:#error Microsoft Foundation Classes require C++ compilation (use a .cpp suffix)
43:#endif
44:
45:typedef unsigned char BYTE;
46:typedef unsigned char PIXEL;
47:typedef unsigned long ULONG;
48:typedef unsigned int UINT;
49:typedef unsigned int BOOLEAN;
50:
51:#define TRUE 1
52:#define FALSE 0
53:
54:class Image
55:{
56:private:
57: BITMAPHANDLE   ImageBitmap;
58: char   pchInputFilename[13];
59: char   pchOutputFilename[13];
60: UINT   iWidth;
61: UINT   iHeight;
62: UINT   iLine;
63: BYTE   *pLine;
64: BYTE   *pCol;
65: BYTE   *pTGALine;
66: FILE   *pfTarga;
67: BOOLEAN   FlagAllocLine;
68: BOOLEAN   FlagAllocCol;
69: void   Error( int errnum );
70:
71:public:
72: //
73: // Class Constructor and Destructor
74: //
75: Image( void );
76: ~Image( void );
77: //
78: // Free allocated Bitmap and memory
```

IMAGE.H

```
 79: //
 80: void FreeMemory(void);
 81: //
 82: // Load and Save image file
 83: //
 84: void Load( char *pchInput );
 85: void Save( char *pchOutput );
 86: //
 87: // Get image Width and Height
 88: //
 89: UINT Width( void );
 90: UINT Height( void );
 91: //
 92: // Get and Put image lines
 93: //
 94: BYTE *GetLine( UINT iLineNum );
 95: void PutLine( BYTE *pLine, UINT iLineNum );
 96: //
 97: // Get and Put image columns
 98: //
 99: BYTE *GetColumn( UINT iLineNum );
100: void PutColumn( BYTE *pLine, UINT iLineNum );
101: //
102: // Create an empty image
103: //
104: void Create( UINT iWidth, UINT iHeight );
105://
106:// END CLASS -- Image
107://
108:)
```

We claim:

1. A sample sequence warping system for receiving and warping an input sequence of source samples to produce an output sequence of target samples, comprising:

a) first means for receiving successive target increments representing desired target spacing between respective ones of said target samples, and in response generating successive filter factor values representing respective FIR filters having sufficient filter coefficients to generate respective ones of said target samples with said desired target spacing;

b) second means for receiving said successive filter factor values and in response selecting predetermined left and right half kernels of said respective FIR filters for generating said respective ones of said target samples;

c) third means for receiving said successive target increments and said successive filter factor values and in response generating a predetermined number of upsampled intermediate samples from said input sequence of source samples; and d) fourth means for applying said upsampled intermediate samples to said predetermined left and right half kernels of said respective FIR filters for generating said output sequence of target samples.

2. The sample sequence warping system of claim 1, wherein said first means comprises a filter look-up table for correlating each said target increment with a respective one of said filter factor values and sizes of said FIR filters.

3. The sample sequence warping system of claim 2, wherein said filter look-up table generates a filter factor value of 0 when said target increment is between 0 and 1.

4. The sample sequence warping system of claim 2, wherein said filter look-up table generates a filter factor value of 1 when said target increment is between 1 and 2.

5. The sample sequence warping system of claim 2, wherein said filter look-up table generates a filter factor value of 2 when said target increment is between 2 and 4.

6. The sample sequence warping system of claim 2, wherein said filter look-up table generates a filter factor value of 3 when said target increment is between 4 and 8.

7. The sample sequence warping system of claim 2, wherein said filter look-up table generates a filter factor value of 4 when said target increment is between 8 and 16.

8. The sample sequence warping system of claim 2, wherein said filter look-up table generates a filter factor value of 5 when said target increment is between 16 and 32.

9. The sample sequence warping system of claim 1, wherein said second means further comprises means for selecting said predetermined left and right half kernels of the largest one of said respective FIR filters on either side of each of said target samples.

10. The sample sequence warping system of claim 9, wherein said means for selecting said predetermined left and right half kernels further comprises:

i) first register means connected to said first means, for receiving and delaying said successive filter factor values by one sample period; and ii) first comparator means connected to said first means and said first register means, for selecting the largest of two successive filter factor values output from said first means and said first register means, and in response outputing successive largest ones of two said successive filter factor values.

11. The sample sequence warping system of claim 10, wherein said third means further comprises:

iii) second register means connected to said first register means for receiving and delaying said successive filter factor values by a further sample period;

iv) second comparator means connected to said first means, said first register means and said second register means, for selecting the largest of three successive filter factor values output from respective ones of said first means, said first register means and said second register means, and in response outputing successive largest ones of three said successive filter factor values;

v) an upsample increment generator for receiving said successive target increments and said successive largest ones of three said successive filter factor values and in response right shifting said successive target increments respectively by said successive largest ones of three said filter factor values to form successive upsample increment values; and vi) interpolator means for receiving said successive binary target increments, said successive upsample increment values and said input sequence of source samples, and in response interpolating said input sequence of source samples to produce said predetermined number of upsampled intermediate samples spaced apart by a respective one of said upsample increment values, said predetermined number being equivalent to a respective one of said target increments divided by said respective one of said upsample increment values.

12. The sample sequence warping system of claim 11, wherein said fourth means further comprises:

vii) third register means connected to said second comparator means for receiving and delaying said successive largest ones of two said successive filter factor values by one sample period;

viii) fourth register means connected to said third register means for receiving and delaying said successive largest ones of two said successive filter factor values by a further sample period;

ix) first half digital filter kernel multiplier accumulator means connected to said third register means and said interpolator means, for receiving and multiplying a first plurality of said upsampled intermediate samples by successive ones of said filter coefficients identified by said successive largest ones of two said successive filter factor values delayed by one sample period and in response generating a first plurality of intermediate product values, summing said first plurality of intermediate product values and in response generating a succession of accumulated intermediate product values; and x) second half digital filter kernel multiplier accumulator means connected to said first half digital filter kernel multiplier accumulator means, said fourth register means and said interpolator means, for receiving and multiplying a second plurality of said successive upsampled intermediate samples by successive ones of said filter coefficients identified by said successive largest ones of two said successive filter factor values delayed by a further sample period and in response generating a second plurality of intermediate product values, summing said second plurality of intermediate product values and in response generating a further succession of accumulated intermediate product values, and summing said succession of accumulated intermediate product values and said further succession of accumulated intermediate product values to generate said output sequence of target samples.

13. The sample sequence warping system of claim 1, wherein said second means further comprises means for selecting said predetermined left and right half kernels from respective ones of said FIR filters on either side of each of said target samples.

14. The sample sequence warping system of claim 13, wherein said third means further comprises:

i) an upsample increment generator for receiving said successive target increments and said successive filter factor values and in response right shifting said successive target increments respectively by said successive filter factor values to form successive upsample increment values; and ii) interpolator means for receiving said successive target increments, said successive upsample increment values and said input sequence of source samples, and in response interpolating said input sequence of source samples to produce said predetermined number of upsampled intermediate samples spaced apart by a respective one of said upsample increment values, said predetermined number being equivalent to a respective one of said target increments divided by said respective one of said upsample increment values.

15. The sample sequence warping system of claim 14, wherein said fourth means further comprises:

iii) register means connected to said first means, for receiving and delaying said successive filter factor values by one sample period;

iv) first half digital filter kernel multiplier accumulator means connected to said register means and said interpolator means, for receiving and multiplying a first plurality of said upsampled intermediate samples by successive ones of said filter coefficients identified by said successive filter factor values delayed by one sample period and in response generating a first plurality of intermediate product values, summing said first plurality of intermediate product values and in response generating a succession of accumulated intermediate product values; and v) second half digital filter kernel multiplier accumulator means connected to said first half digital filter kernel multiplier accumulator means, said register means and said interpolator means, for receiving and multiplying a second plurality of said successive upsampled intermediate samples by successive ones of said filter coefficients identified by said successive filter factor values delayed by said one sample period and in response generating a second plurality of intermediate product values, summing said second plurality of intermediate product values and in response generating a further succession of accumulated intermediate product values, and summing said succession of accumulated intermediate product values and said further succession of accumulated intermediate product values to generate said output sequence of target samples.

16. A sample sequence warping method for receiving and warping an input sequence of source samples to produce an output sequence of target samples, comprising the steps of:

a) receiving successive target increments representing desired target spacing between respective ones of said target samples, and in response generating successive filter factor values representing respective FIR filters having sufficient filter coefficients to generate respective ones of said target samples with said desired target spacing;

b) receiving said successive filter factor values and in response selecting predetermined left and right half kernels of said respective FIR filters for generating said respective ones of said target samples;

c) receiving said successive target increments and said successive filter factor values and in response generating a predetermined number of upsampled intermediate samples from said input sequence of source samples; and d) applying said upsampled intermediate samples to said predetermined left and right half kernels of said respective FIR filters for generating said output sequence of target samples.

17. The sample sequence warping method of claim 16, wherein said step of receiving said successive filter factor values and in response selecting predetermined left and right half kernels of said respective FIR filters for generating said respective ones of said target samples further comprises selecting said predetermined left and right half kernels of the largest one of said respective FIR filters on either side of each of said target samples.

18. The sample sequence warping method of claim 17, wherein said step of selecting said predetermined left and right half kernels further comprises:

i) receiving and delaying said successive filter factor values by one sample period; and ii) selecting the largest of two successive filter factor values and in response outputting successive largest ones of two said successive filter factor values.

19. The sample sequence warping method of claim 18, wherein said step of receiving said successive target increments and said successive filter factor values and in response generating a predetermined number of upsampled intermediate samples from said input sequence of source samples further comprises:

iii) receiving and delaying said successive filter factor values by a further sample period;

iv) selecting the largest of three successive filter factor values and in response outputting successive largest ones of three said successive filter factor values;

v) receiving said successive target increments and said successive largest ones of three said successive filter factor values and in response right shifting said successive target increments respectively by said successive largest ones of three said filter factor values to form successive upsample increment values; and vi) receiving said successive binary target increments, said successive upsample increment values and said input sequence of source samples, and in response interpolating said input sequence of source samples to produce said predetermined number of upsampled intermediate samples spaced apart by a respective one of said upsample increment values, said predetermined number being equivalent to a respective one of said target increments divided by said respective one of said upsample increment values.

20. The sample sequence warping method of claim 19, wherein said step of applying said upsampled intermediate samples to said predetermined left and right half kernels of said respective FIR filters for generating said output sequence of target samples further comprises:

vii) receiving and delaying said successive largest ones of two said successive filter factor values by one sample period;

viii) receiving and delaying said successive largest ones of two said successive filter factor values by a further sample period;

ix) receiving and multiplying a first plurality of said upsampled intermediate samples by successive ones of said filter coefficients identified by said successive largest ones of two said successive filter factor values delayed by one sample period and in response generating a first plurality of intermediate product values, summing said first plurality of intermediate product values and in response generating a succession of accumulated intermediate product values; and x) receiving and multiplying a second plurality of said successive upsampled intermediate samples by successive ones of said filter coefficients identified by said successive largest ones of two said successive filter factor values delayed by a further sample period and in response generating a second plurality of intermediate product values, summing said second plurality of intermediate product values and in response generating a further succession of accumulated intermediate product values, and summing said succession of accumulated intermediate product values and said further succession of accumulated intermediate product values to generate said output sequence of target samples.

21. The sample sequence warping method of claim 16, wherein said step of receiving said successive filter factor values and in response selecting predetermined left and right half kernels of said respective FIR filters for generating said respective ones of said target samples further comprises selecting said predetermined left and right half kernels from respective ones of said FIR filters on either side of each of said target samples.

22. The sample sequence warping method of claim 21, wherein said step of receiving said successive target increments and said successive filter factor values and in response generating a predetermined number of upsampled intermediate samples from said input sequence of source samples further comprises:

i) receiving said successive target increments and said successive filter factor values and in response right shifting said successive target increments respectively by said successive filter factor values to form successive upsample increment values; and ii) receiving said successive target increments, said successive upsample increment values and said input sequence of source samples, and in response interpolating said input sequence of source samples to produce said predetermined number of upsampled intermediate samples spaced apart by a respective one of said upsample increment values, said predetermined number being equivalent to a respective one of said target increments divided by said respective one of said upsample increment values.

23. The sample sequence warping method of claim 22, wherein said step of applying said upsampled intermediate samples to said predetermined left and right half kernels of said respective FIR filters for generating said output sequence of target samples further comprises:

iii) receiving and delaying said successive filter factor values by one sample period;

iv) receiving and multiplying a first plurality of said upsampled intermediate samples by successive ones of said filter coefficients identified by said successive filter factor values delayed by one sample period and in response generating a first plurality of intermediate product values, summing said first plurality of intermediate product values and in response generating a succession of accumulated intermediate product values; and v) receiving and multiplying a second plurality of said successive upsampled intermediate samples by successive ones of said filter coefficients identified by said successive filter factor values delayed by said one sample period and in response generating a second plurality of intermediate product values, summing said second plurality of intermediate product values and in response generating a further succession of accumulated intermediate product values, and summing said succession of accumulated intermediate product values and said further succession of accumulated intermediate product values to generate said output sequence of target samples.

* * * * *